United States Patent Office 3,809,767
Patented May 7, 1974

---

3,809,767
METHODS OF MAKING VEGETABLE PROTEIN CONCENTRATES
Louis Sair, Evergreen Park, and Irving Melcer, Park Forest, Ill., assignors to The Griffith Laboratories, Inc., Chicago, Ill.
No Drawing. Original application May 12, 1969, Ser. No. 823,969, now abandoned. Divided and this application Sept. 7, 1971, Ser. No. 178,464
Int. Cl. A23j 3/00
U.S. Cl. 426—364
40 Claims

ABSTRACT OF THE DISCLOSURE

Methods of producing comestible, uniformly palatable, vegetable protein concentrate either (1) having natural structure or natural texture, or (2) not having natural structure or natural texture, which comprise extracting vegetable protein meal having defatted soy protein or defatted peanut protein materials having natural structure or natural texture and having a nitrogen solubility index above 15% by weight (preferably above 40% by weight) in the vicinity of the isoelectric pH of the recovered protein content thereof and substantially removing the soluble, undesired or objectionable, characteristic taste-conferring material and recovering the insoluble, wet protein material, partly drying said wet, insoluble protein material to reduce the moisture content thereof under controlled conditions to moisture content within the range of about 5 to 55% (preferably within the range of about 20–45%) without lowering its nitrogen solubility index to below 15% by weight (preferably not below 40% by weight), selectively raising the pH ("neutralizing") of the protein material of said partly dried, insoluble protein material, in the presence of water, within the pH range of about 5.5 to 10.5, and either drying the protein material having the raised pH under controlled conditions or, in a selected sequence, drying said protein material under controlled conditions and comminuting said protein material, to produce said vegetable protein concentrate which is characterized by (a) having been substantially freed of undesired or objectionable, characteristic taste-conferring material which characterizes the vegetable protein material from which the concentrate is prepared,
(b) good protein solubility and minimized denaturation characteristics as evidenced by a nitrogen solubility index of at least 15% by weight (preferably at least 40% by weight),
(c) good water-absorption and water-retention properties,
(d) good water-binding properties, and
(e) at least about 60% by weight protein on a dry weight basis (preferably at least about 70% by weight protein on a dry weight basis).

Comminuting (e.g., grinding or subdividing by suitable means) tends to result in the attendant loss of at least some of the natural structure or natural texture of the concentrate, and provides a concentrate having enhanced emulsifying properties.

---

This application is a continuation-in-part application of our pending application Ser. No. 823,969, filed May 12, 1969, (now abandoned).

Our invention relates to improved methods of making edible, uniformly palatable, bland, vegetable protein concentrates such as exemplified by defatted soy or defatted peanut protein concentrates which are suitable for use in food products for humans.

Furthermore, if desired, the vegetable protein concentrate can be subdivided by being comminuted (e.g., ground), and/or subjected to bacterial control.

The terms "vegetable protein material" or "vegetable protein materials," as used herein, refer to defatted soy protein material and/or defatted peanut protein material.

The terms "natural structure and texture" and "natural structural and textural," as used herein, mean natural structure and natural texture, and natural structural and natural textural, respectively.

The term "concentrate" herein refers to vegetable protein material having at least about 60% by weight protein on a dry weight basis and, preferably, at least about 70% by weight protein on a dry weight basis.

As hereinafter used, the values designated for the "nitrogen solubility index" or "NSI" are determined in accordance with the procedure shown in Test 1, below. Tests 2 and 3, below, concern cold water-absorption and hot water-absorption tests, respectively. Test 4, below, is directed to a procedure for determining viscosity.

One of the greatest obstacles to the general use in this country of oil seed, vegetable protein materials as a direct source of human food products, is the characteristic, undesired or objectionable taste or flavor which is evidenced, for example, in soybean and peanut meal or flour by a bitter or beany taste associated therewith. A great amount of research has ben conducted to try to eliminate this objectionable characteristic, and many approaches have been used with varying degrees of success.

When one uses highly proteinaceous, vegetable protein materials having natural structure and texture, such as oil seed, vegetable protein materials, which have protein cell bodies characterized by natural structural and textural integrity and coarseness (e.g., a substantial or major portion, on a weight basis, of such materials do not pass through a 40-mesh screen) in coarsely ground, meat products, the resulting meat products have a desirable texture and bite which is pleasing to the mouth.

Defatted or deoiled soybean grits (dehulled, coarse grain, soybean protein product) having natural structure and texture, including those produced from soybean flakes, for example, which have about 50% by weight protein on a dry basis, have been mixed with ground meat products. Soybean grits, when used within controlled proportions, blend well with meat products, and when coarsely ground, meat products having soybean grits are cooked, the resulting meat products retain their desired character and, as a result, the feel and texture of such meat products in the mouth are excellent. In many other respects, soybean grits are an ideal extender for meat products, since the grits aid in retaining or binding the natural water of the meat and in binding such products during cooking.

When 5 pounds of defatted or deoiled soybean grits, for example, are added to 100 pounds of coarsely ground meat, one may add an additional 10 to 15 pounds of water and still have a very suitable, commercial meat patty from the standpoint of consistency and appearance.

There is an increased demand for edible, vegetable protein products having good structure and texture, particularly protein concentrates which are uniformly palatable and bland and suitable for use in food products such as coarsely ground, meat products as exemplified by meat patties or hamburger, meat loaf, and the like. An increased interest exists in providing improved, vegetable protein concentrates having natural structure and texture, and at least about 60% by weight protein on a dry basis, or, preferably, at least about 70% protein on a dry basis.

A number of procedures have been heretofore proposed to obtain vegetable protein materials such as oil seed, vegetable protein products which have natural structure and texture. However, such procedures subject the vegetable protein material used therein to conditions which denature the protein and thereby produce protein products having poor or low protein solubility characteristics as evidenced by their low nitrogen solubility indices (NSI). Denaturation of vegetable protein decreases its ability to bind water and emulsify fat, which are important shortcomings. Furthermore, such procedures often do not remove satisfactorily undesired taste- or flavor-conferring material.

An improved, commercial substantially waterinsoluble, soy protein concentrate having good structure and texture, known as "Patti-Pro" concentrate, has been made and used. That proteinaceous soybean concentrate is an essentially dry composition which is edible, has good natural structure and texture, and is substantially water-insoluble, uniformly palatable, debittered, bland, and porous.

"Patti-Pro" concentrate is made commercially, for example, by subjecting denatured, toasted, defatted or de-oiled soybean grits having good natural structure and texture and a nitrogen solubility index (NSI) below about 15% by weight to the dissolving action of an aqueous bath which lowers the pH of the soybean protein to about 4.2–4.5. The resulting protein slurry is stirred, and de-watered to separate insoluble, soy protein material from the liquid extract. The recovered, insoluble, soy protein material is washed by mixing it with water. The slurry is then centrifuged. The soluble material which is removed with the liquid extract and by washing includes undesired beany taste- and flavor-conferring material. The recovered, washed, insoluble, soy protein material is then neutralized by raising its pH to 6.0–6.7. The neutralized, soy protein concentrate is then dried in a horizontal, fluid bed drier. The dried concentrate is a denatured, insoluble, soy protein concentrate having at least about 70% by weight protein on a dry basis.

"Patti-Pro" concentrate is very effectively used in coarsely ground, meat products such as meat patties or hamburger and meat loaf. It retains its good natural meat products and provides meat products having good texture and bite characteristics; however, that concentrate has poor protein solubility characteristics and a low nitrogen solubility index (NSI of less than about 15% by weight). Further, it has a relatively low viscosity. Still further, it has the desirable characteristics of absorbing or binding water much like a sponge without assuming the highly viscous, gummy or sticky form in the mouth one seeks to avoid with such meat products.

Because of the low protein solubility of "Patti-Pro" concentrate, it has been blended with a soluble, relatively fine, soy protein concentrate not having good structure and texture (and not having natural structure and texture), known as "GL–301" concentrate, having a high nitrogen solubility index (e.g., NSI of about 45–70% by weight or somewhat lower). "Patti-Pro" and "GL–301" concentrates have been blended, for example, in weight ratios of about 3 to 1 to enhance the solubility fat-emulsifying, water-absorption and water-retention characteristics of the blend for use in coarsely ground, meat products.

"GL–301" concentrate is made in accordance with U.S. Pat. 2,881,076, has a higher viscosity and better emulsifying and water-binding characteristics than "Patti-Pro" concentrate, and is particularly well-suited for use in finely comminuted, meat emulsions such as frankfurters, sausage products and luncheon meats where its lack of natural structure and texture (and lack of structure and texture) and high viscosity characteristics are found to be desirable characteristics.

The inclusion of the finely divided "GL–301" concentrate in the above-described blend diminishes the percent of protein present therein having natural structure and texture (and structure and texture). "GL–301" concentrate introduces into the blend a soluble, finely divided, protein concentrate which, when compared with "Patti-Pro" concentrate, has better protein solubility, a higher viscosity, better water-absorption and water-retention characteristics, and better emulsifying and water-binding characteristics. Thus, the blend overcomes some of the disadvantages resulting from the use of "Patti-Pro" concentrates alone; however, it also detracts from some of the important advantages (natural structure and texture and not too high a viscosity) sought and obtained in coarsely ground, meat products with the "Patti-Pro" concentrate.

Our invention includes or relates to improved, edible, uniformly palatable, bland, nutritious, highly proteinaceous, vegetable protein concentrates (e.g., protein concentrates from cotyledon seeds), such as exemplified by defatted soy and defatted peanut protein concentrates, having natural structure and texture (proteinaceous cell bodies having natural cell structure or natural cell texture). These concentrates are suitable for use in food products for humans, and, among other things: have desired, natural structure and texture as evidenced by good natural structural and textural integrity or coarseness (proteinaceous cell bodies have naturally existing, cell structure or texture); have good protein solubility and minimized denatured protein characteristics as evidenced, for example, by a high nitrogen solubility index (e.g., NSI of at least 15% or above 15% by weight and, preferably, at least about 40% by weight); have good water-absorption and water-retention characteristics; have good water-binding characteristics; have at least about 60% by weight protein on a dry basis and, preferably, at least about 70% by weight protein on a dry basis; and, have been substantially freed of undesired or objectionable, characteristic taste- or flavor-conferring material (e.g., debittered or rendered bland) associated with the proteinaceous source from which the concentrates are prepared.

In making our vegetable protein concentrates having defatted soy protein or defatted peanut protein, and good natural structure and natural texture, the natural structure and natural texture (natural cell structure and texture of the protein bodies) of the vegetable protein material (defatted soy or defatted peanut protein materials) that is used or treated in accordance with our invention is not destroyed or is substantially retained as it exists in nature and need not be synthesized. The good natural structural and natural textural integrity or coarseness of the protein cell bodies of these concentrates are not or need not be gained or created by or imparted to the proteinaceous vegetable material (defatted soy or defatted peanut protein materials) through or as the result of a synthetic texturizing process or step (e.g., spinning or expansion or puffing of vegetable protein material) practiced during or as part of our invention. (It should be noted that the natural structure and texture of foods such as uncooked celery and peanuts have a pleasing texture feel and bite in the mouth which contribute to their appetizing appeal.)

When defatted soy or defatted peanut protein materials having natural structure and natural texture used in the manufacture of our concentrates are subdivided or comminuted (e.g., ground) before and/or after they have been dried, the resulting soluble, vegetable protein concentrates have substantially enhanced (increased) viscosity characteristics (see Test 4, below), the natural structure and natural texture of such materials will be broken down (characteristics which one often finds objectionable and seeks to avoid), and have good emulsifying and protein solubility characteristics as evidenced by their nitrogen solubility index (NSI).

It has been found that when the natural structure and texture of the protein cell bodies of vegetable protein materials such as defatted or deoiled soy protein material are retained, in accordance with our invention, soluble, vegetable protein concentrates of our invention have a higher nitrogen solubility index (e.g., NSI within the range of 15–70% by weight and, preferably, an NSI of at least about 40% by weight), better water-absorption and water-retention properties, and better emulsifying and water-binding properties in coarsely ground, meat products than have been obtained with "Patti-Pro" concentrate, a soy protein concentrate having a low nitrogen solubility index (NSI) but having good natural structure and texture. Furthermore, such soy protein concentrates of our inventions have better water-absorption, water-retention, water-binding, and emulsifying characteristics than the soy meal from which the concentrates are made.

Similarly, with respect to our soluble protein concentrates such as peanut concentrate having natural structure and texture, the concentrates have better water-absorption and water-retention properties, and better emulsifying and water-binding properties than the peanut meal from which the concentrates are made.

Referring to some of the examples set forth later below and water-absorption, water-retention and viscosity tests and values referred to therein:

Example I (Table IE), below, compares the water-absorption and water-retention characteristics of (a) a defatted soy protein concentrate of our invention having natural structure and texture (made using pre- and post-neutralization drying) with (b) a "Patti-Pro" concentrate;

It is evident, for example, upon consideration of Table IE of Example I, below, that after water was added to a soy protein concentrate having natural structure and texture and embraced by our invention, and a "Patti-Pro" concentrate, both concentrates absorbed water and swelled. However, after 30 minutes of soaking, substantially no water could be squeezed by hand from the concentrate of this invention, whereas a substantial quantity of water was squeezed readily from the "Patti-Pro" concentrate;

Examples I (Table IF) and II (Table IID), below, compare the water-absorption characteristics of (a) soy protein concentrates of our invention having natural structure and texture (made using pre- and post-neutralization drying) with (b) a "Patti-Pro" concentrate and (c) the soy protein grits or meal from which our soy protein concentrates were made;

Example VI (Table VIA), below, compares the water-absorption characteristics of (a) soy protein concentrates of our invention having natural structure and texture (made using pre- and post-neutralization drying) with (b) a "Patti-Pro" concentrate;

Example XV (Table VID), below, compares the water-absorption characteristics of (a) a peanut protein concentrate of our invention having natural structure and texture (made using pre- and post-neutralization drying) with (b) the peanut meal from which our peanut protein concentrate was made;

Examples I (Table IG), II (Table IIE), III (Table IIID), and VI (Tables VIB and VIC), below, compare the viscosity characteristics of (a) soy protein concentrates of our invention (made using pre- and post-neutralization drying) to produce a concentrate having natural structure and texture and which is then subdivided (subdividing the concentrate is part of the procedure for determining viscosity in accordane with Test 4 described below) with (b) a "GL–301" concentrate;

Example XV (Table XV E), below, shows the viscosity characteristics of a peanut protein concentrate of our invention (made using pre- and post-neutralization drying) to produce a concentrate having natural structure and texture and which is then subdivided (subdividing the concentrate is part of the procedure for determining viscosity in accordance with Test 4 described below).

In one of our preferred methods for producing vegetable protein concentrates having good natural structure and texture, substantially undenatured, vegetable protein materials such as exemplified by, vegetable protein meal (the term "meal" herein includes grits, flakes or other coarse forms) having defatted soy or defatted peanut protein materials, and good natural structure and texture are extracted in the vicinity of the isoelectric pH of the recovered protein content (e.g., isoelectric pH of the glycinin content of soybean protein). The insoluble, extracted, vegetable protein material having natural structure and texture is at least partly dried (preferably without substantially denaturing the soy protein material) under suitable controlled drying conditions which do not reduce the nitrogen solubility index of the protein below 15% or even 40% by weight. The pH of the at least partly dried, vegetable protein material is selectively raised or adjusted ("neutralized") in the presence of a controlled level of water without forming a viscous, gummy or sticky mass which can substantially destroy the desired natural structural and textural coarseness or integrity of the vegetable protein material. If too much water is removed during pre-neutralization drying, water can be added later for purposes of neutralization. The neutralized vegetable protein material is suitably dried (preferably without substantially denaturing the protein material) under controlled conditions to produce our improved, essentially dry, edible, uniformly palatable, vegetable protein concentrate having good natural structure and texture and a nitrogen solubility index (NSI) of at least or more than 15% by weight, and, preferably, at least about 40% by weight.

In making these concentrates having natural structure and texture, the natural structure and texture (natural cell structure or natural cell texture of the protein bodies) of the vegetable protein material that is treated is retained during processing, in accordance with our invention, so that the resulting concentrates have these characteristics; when such concentrates are used in various meat products, meat products are produced having a desirable texture and bite which is pleasing to the mouth. Thus, no special processing steps are required to introduce such characteristics to the protein material.

If desired, the soluble, vegetable protein concentrates having natural structure and texture can be subjected to bacterial control (e.g., bactericidal heating) without requiring undesired denaturation of the protein. That is, the nitrogen solubility index of the concentrate is not lowered to below 15% by weight, or, in some instances, it is not lowered to below about 40% by weight, by the use of bacterial control.

In the event one destroys the natural structure and texture of the protein bodies and/or the soluble, vegetable protein concentrate having natural structure and texture is ground or subdivided during processing too finely, the resulting defatted soy or defatted peanut concentrate has an increased or enhanced viscosity. The attainment of too high a viscosity should be avoided with protein concentrates which are to be incorporated in coarsely ground, meat products, since an excessive viscosity results in producing a sticky, viscous meat product which can inhibit the operation of an automatic patty machine. Also, too high a viscosity may cause such meat products to form an undesired, viscous, gummy or sticky taste in the mouth. However, such concentrates can be used effectively or advantageously in finely comminuted, meat emulsions, such as frankfurters, sausages and luncheon meat, where high viscosity properties are desired and the absence of natural structure and texture are acceptable or desired.

Still further, when the natural structure and texture of our soluble, vegetable protein material having defatted soy protein or defatted peanut protein has been destroyed, the resulting concentrate of our invention can be subjected to terminal bacterial control without requiring the denaturation of protein which causes the nitrogen solubility index to reach a level below 15% by weight or even below about 40% by weight.

Referring to our methods more specifically, first, vegetable protein material such as oil seed, vegetable protein material, a substantial or major portion of which will not pass through a 40-mesh screen, which has good natural structure and texture, a nitrogen solubility index (NSI) of more than 15% by weight (preferably, more than about 40% by weight) and which, preferably, has been defatted or deoiled, including defatted or deoiled soybean or peanut meal (the term "meal" herein includes grits, flakes or other coarse forms), is made up into an aqueous slurry (e.g., having about 5–20% by weight solids) in which the pH of the vegetable protein material is selectively adjusted to the vicinity of the isoelectric point or range of its recovered protein content (e.g., isoelectric pH of glycinin content for soy protein).

Generally, the adjusted pH for oil seed, vegetable protein such as defatted soybean or peanut protein is about 4.2, but the adjusted pH may be in the range, for example, of approximately 4.0 through 4.8 for such protein materials. Many edible, acidic materials (e.g., acetic acid, hydrochloric acid, sulfuric acid, sulfurous acid and phosphoric acid), either organic or inorganic, may be used to achieve a pH in the vicinity of the isoelectric pH. The combination of hydrochloric acid and sodium bisulfite is a preferred reagent.

The duration of the isoelectric wash is dependent upon the particular process conditions used.

When the isoelectric extraction treatment has been concluded, the resulting liquid extract, which includes soluble, defatted soy or defatted peanut vegetable protein material and undesired, characteristic taste- or flavor- (e.g., bitter, beany, nut-like or chalky taste or flavor), and odor- or color-conferring ingredients found in the vegetable protein material from which the concentrates are made, is separated and discarded by a centrifuging, screening or filtering operation from the insoluble, vegetable protein solids. The recovered insoluble, vegetable protein material having natural structure and texture may be further washed with water which may have a somewhat acid pH for bacterical purposes, followed by being filtered, screened or centrifuged. The resulting insoluble, vegetable protein slurry has a pH in the vicinity of the isoelectric point of the protein content thereof, and has, for example, about 65–75% by weight protein determined on a dry basis.

Following the isoelectric extraction or washing procedure, the defatted soy or defatted peanut vegetable protein material must be at least partly dried under controlled conditions and then neutralized.

Neutralization is accomplished by adding an edible, inorganic alkali or inorganic buffering agent (e.g., sodium carbonate, sodium bicarbonate, sodium hydroxide, disodium phosphate, trisodium phosphate, sodium tripolyphosphate, tetrasodium pyrophosphate, the analogous potassium phosphates, and ammonium hydroxide) or admixtures thereof to the insoluble, vegetable protein material in the presence of water and with mixing to raise or adjust (sometimes herein referred to by terms such as "neutralizing," "neutralization," "neutralize" or "neutralized") the pH of the vegetable protein material to within the range from about 5.5 to about 10.5, preferably to a pH of at least 6.

The neutralization step raises the pH of the defatted soy or defatted peanut protein material, thus rendering the undenatured, vegetable protein material soluble and thereby enhancing the water-binding and emulsifying characteristics of the protein material, which characteristics are important when the concentrate is used in meat and other food products.

We have discovered that one can facilitate the retention of natural structure and texture by partly drying (e.g., flash drying) the vegetable protein slurry prior to neutralization (e.g., reducing the moisture content from about 60–80% by weight water to within the range of about 5–55% and, preferably, to within the range of about 20–45% by weight water), whereby the subsequent neutralization step does not break down the natural structural and textural coarseness or integrity of the partly dried, vegetable protein material (obviates forming an undesired, highly viscous, gummy or sticky mass during neutralization). If too much water is removed by this pre-neutralization drying step, a controlled amount of water can be added prior to or during neutralization. The drying step, must be conducted under sufficiently low, controlled, drying-temperature-time conditions which enable one to obtain a soluble, defatted soy or defatted peanut vegetable protein concentrate having a nitrogen solubility index of at least 15% or well above 15% by weight and, preferably, should be conducted under conditions which do not substantially denature the vegetable protein concentrate as evidenced by the concentrate having a nitrogen solubility index of at least about 40% by weight.

Subsequent to neutralization of the pre-dried, defatted soy or defatted peanut vegetable protein material, the neutralized, soluble, defatted soy or defatted peanut vegetable protein concentrate having natural structure and texture is dried (e.g., flash dried) to the desired moisture content. We have discovered that when this post-neutralization drying step is conducted under sufficiently low, controlled, drying-temperature-time conditions, such as referred to above, the resulting essentially dry, neutralized, soluble, vegetable protein concentrate has a nitrogen solubility index of at least 15% or well above 15% by weight, and, preferably, has not been substantially denatured as evidenced by having a nitrogen solubility index of at least about 40% by weight.

In the event one is primarily interested in obtaining a soluble, defatted soy or defatted peanut vegetable protein concentrate having natural structural and textural coarseness or integrity (natural structure and texture), so that a substantial or major portion will not pass through a 40-mesh screen, and a nitrogen solubility index of at least 15% or well above 15% by weight, and is less concerned with obtaining the maximum levels of nitrogen solubility index which can be obtained (e.g., NSI of at least about 40% by weight) and excellent protein solubility which result from avoiding excessive drying-temperature-time conditions, then the necessity of controlling sufficiently the drying step to avoid denaturation is alleviated to some degree and one need exercise only the control sufficient to suit one's particular protein solubility needs within the desired nitrogen solubility index range (e.g., NSI of 15–70% by weight).

After conducting post-neutralization drying, for certain food applications we have found that when vegetable protein concentrates having defatted soy or defatted peanut protein materials, and natural structure and texture are subdivided (e.g., ground), the natural structure and texture are broken down and the resulting concentrates have a higher viscosity and as a result have outstanding emulsifying, NSI and water-binding properties.

As indicated above, our finely divided, soluble, defatted soy and defatted peanut protein concentrates no longer having natural structure and texture, although not as advantageously used in coarsely ground, meat products as our concentrates having natural structure and texture, may be used advantageously or effectively, if desired, in finely emulsified, meat products such as frankfurters, sausages, and luncheon meat, where soluble, vegetable protein concentrates having a high viscosity and good emulsifying, NSI and water-binding characteristics are sought. Such finely divided, soluble, vegetable protein concentrates of our invention can be used also, if desired, in cereals, gravies, sauces, soups, baked goods, and bland delicate desserts and milk products.

When denaturation is not controlled sufficiently in our processes, the nitrogen solubility index will be relatively lower (e.g., within an NSI range of 15–40% by weight) than it would be when denaturation is more carefully controlled (e.g., within an NSI range of about 40–70% by weight); however, even when such close control of denaturation is not exercised, denaturation must not be allowed to lower the nitrogen solubility index of the defatted soy or defatted peanut vegetable protein concentrate below 15% by weight.

When one wishes to avoid substantial denaturation so that the defatted soy or defatted peanut vegetable protein has a nitrogen solubility index of at least about 40% by weight, the pre-neutralization drying step must be conducted under particularly well-controlled, drying-temperature-time conditions. Particularly good results have been obtained in the preferred methods, for example, with soy protein material, when the temperature of the vegetable protein material generally does not exceed about 140° F.

Post-neutralization drying ultimately should reduce the moisture content of the moist neutralized mass, preferably, to below about 10% by weight water.

It has been found for commercial operations involving our preferred methods of manufacture that: dynamic drying systems (rather than static drying systems), such as flash drying (e.g., with fluid bed driers or ring driers), wherein the defatted soy or defatted peanut vegetable protein is subjected to movement are preferred; the drying time should be kept to minimum required levels; and, the evaporation loss of moisture should be sufficient to keep the defatted soy or defatted peanut vegetable protein generally below the maximum satisfactory temperature during drying.

The resulting essentially dried, neutralized, soluble, defatted soy or defatted peanut vegetable protein concentrate has a high protein content (e.g., above about 60% by weight protein on a dry weight basis, and usually at least about 70% by weight protein on a dry weight basis).

Still further, we have discovered that effective terminal bacterial control of our soluble, defatted soy or defatted peanut vegetable protein concentrate is obtained without obtaining a concentrate having a nitrogen solubility index below 15% by weight or even below 40% by weight, by subjecting the dried, neutralized, soluble, defatted soy or defatted peanut vegetable protein concentrate to additional and somewhat higher or more severe drying conditions (e.g., heating, for example, soy protein concentrate at about 170–190° F. in a vertical, fluid bed drier). At this stage of the process, and because of the previous removal of most of the water, the use of such controlled drying conditions does not present as severe a denaturation problem.

Table A, below, shown for illustrative purposes only, shows comparative characteristics of an illustrative "Patti-Pro" concentrate, and certain dried, soluble, neutralized, soy protein concentrates made in accordance with our invention, as herein disclosed, when tested by procedures set forth in Tests 1–4, below. As is evident from Table A, certain vegetable protein concentrates within our invention, such as soluble, soy protein concentrates, have better characteristics than the illustrative "Patti-Pro" concentrate.

TABLE A.—COMPARATIVE PROPERTIES OF SOY PROTEIN CONCENTRATES

| Concentrate | Debittered flavor | Texture | Nitrogen solubility index (NSI) | Emulsifying and water-binding characteristics in ground meat | Water-absorption and retention | Viscosity [1] |
|---|---|---|---|---|---|---|
| "Patti-Pro" concentrate | Good | Natural structure and texture | Less than about 10–15% by weight | Not as good as concentrates within this invention | Good | Generally not as high as concentrates within this invention. |
| Essentially dried, neutralized concentrates within this invention | do | Natural structure and texture unless one intends otherwise (e.g., comminutes) | About 15–70% by weight and in an upper portion of this range (e.g., about 40–70% by weight) when drying is controlled to avoid substantial denaturation | Good, particularly when its NSI is in an upper portion of the range of about 15–70% by weight (e.g., about 40–70% by weight), evidencing the lack of substantial denaturation | Generally better hot and cold absorption than "Patti-Pro" concentrate when natural structured coarseness or texture is retained or obtained | Generally higher than "Patti-Pro" concentrate in absence of substantial denaturation. |

[1] Test 4 involves subdividing the concentrate before its viscosity is determined.

Tests 1–4, below, set forth the general procedures which were used in the examples in making the nitrogen soluble index (NSI), cold water absorption, hot water absorption, and viscosity studies.

TEST 1

Nitrogen solubility index

Throughout the specification and in the claims, nitrogen solubility index (NSI) values are based on this general test procedure.

A 10-gm. aliquot of the sample to be tested is added to a Waring Blendor cup having 200 ml. of distilled water, and the slurry is blended for 3 minutes at high speed.

The blended slurry is transferred quantitatively to a 400 ml. beaker, using small rinses when needed. The pH of the transferred slurry is adjusted, if necessary, to a pH of 6.7–6.9 with 1 NaOH or 1 HCl. The suspension is then stirred for 15 minutes at slow speed with care so as to avoid creating a vortex action or stirring in air. The slurry is diluted to 500 ml. with distilled water.

A 250 ml. aliquot is centrifuged, using a 250 ml. cup, for 10 minutes at 2,500 r.p.m. (1600× g.).

A 50.0 ml. aliquot of clear or translucent supernatant free of suspended particles (if necessary, filter) is transferred to a Kjeldahl flask and the nitrogen content is determined by the Kjeldahl method. (A smaller aliquot may be used if the soluble nitrogen content is unusually high.)

The percent by weight of soluble nitrogen of the sample is calculated based on $\frac{1}{10}$ of the weight of the material initially used, as follows:

$$NSI = \frac{\text{Soluble Nitrogen}}{\text{Total Nitrogen}} \times 100\%$$

TEST 2

Cold water-absorption (40° F.)

Ten sheets of Whatman No. 3 filter paper are trimmed to fit inside a petri dish 9 cm. in diameter. Seven of those sheets are placed in the bottom of the petri dish.

Four gms. of the sample to be tested are added to a 4-oz. jar, 12 ml. of water are added to the jar, and the jar is sealed and allowed to stand at room temperature for 30 minutes.

The entire contents of the jar are spread evenly over the 7 sheets of filter paper which were placed inside the petri dish. Then, the remaining 3 sheets of filter paper are placed directly on the wet sample, the lid is placed on the petri dish, the dish is placed overnight in a cooler at 40° F., and the dish is then removed.

The excess moisture is absorbed by the filter paper.

The moist sample is placed on a weighing dish and is weighed. If the weight of the sample is 8 gms. (doubled), then the water-absorption is deemed to be 100% by weight.

TEST 3

Hot water-absorption (155–160° F.)

Ten sheets of Whatman No. 3 filter paper are trimmed to fit inside a petri dish 9 cm. in diameter. Seven of those sheets are placed in the bottom of the petri dish.

Four gms. of the sample to be tested are added to a glass moisture dish which is 5 cm. in diameter and 1½ cm. high (to bottom of glass cover), and 12 ml. of water are added to the dish. As soon as the water soaks into the sample, the glass cover is placed on the dish, the dish is placed in an air oven at 105° C. for 35 minutes, and the dish is then removed. The temperature of the wet sample will reach from 155° F. to 160° F. in the oven.

The dish is allowed to stand at room temperature for 1 hour after removal from the oven, after which the sample is spread evenly over the 7 sheets of filter paper which were placed inside the petri dish. Then, the remaining 3 sheets of filter paper are pressed gently on the surface of the wet sample, the lid is placed on the petri dish, the dish is placed overnight in a cooler at 40° F., and the dish is then removed.

The excess moisture is absorbed by the filter paper.

The moist sample is placed on a weighing dish and is weighed. If the weight of the sample is 8 gms. (doubled), then the water-absorption is considered to be 100% by weight.

TEST 4

Viscosity

A prescribed percent by weight of water is added to the sample of concentrate which has been ground ("GL–301" concentrate was of such a small particle size it was not ground) so as to pass through a 100-mesh screen. The pH of the resulting slurry may be adjusted (e.g., about 6.5–7.5) when one wishes to make a comparison with a different sample, so such comparisons are made with samples having a substantially similar pH.

The viscosity of the wet concentrate is determined in centipoises with a Brookfield Synchro-Lectric Viscometer, Model LVT, #2 spindle.

"Patti-Pro" concentrate referred to herein

A commercial, substantially water-insoluble proteinaceous soybean concentrate having good structure and texture, known as "Patti-Pro" concentrate, is made commercially, for example, by suspending 15 lbs. of F. F. Coarse Soy Grits (A. E. Staley Manufacturing Company), a toasted, defatted soybean grits having a nitrogen solubility index (NSI) below about 15% by weight, in 10 gals. of water. 0.075 pound of sodium bisulfite is added to the suspension, followed by the addition of sufficient 22° Bé. hydrochloric acid to bring the pH of the soy protein down to about 4.2–4.5. The slurry is stirred for about 30 minutes. The slurry is dewatered in a Sweco Vibro-Energy Separator to separate insoluble, soy protein material from the liquid extract. The recovered, insoluble, soy protein material is diluted with 7 gals. of water, and the slurry is mixed for about 30 minutes. The slurry is sent to a Mercone centrifuge, and the recovered, insoluble, soy protein material is then neutralized at a pH of 6.0–6.7 with a 5–20% by weight solution of sodium hydroxide. The neutralized, soy protein concentrate is then dried in a horizontal, fluid bed drier having air inlet and outlet temperatures of about 400–450° F. and about 180–200° F., respectively.

These process conditions have been varied in some instances.

"Patti-Pro" composition is very effectively used in coarsely ground meat products such as meat patties and meat loaf. It retains its good structural and textural coarseness and integrity and provides meat products having good texture and bite characteristics, but it has a nitrogen solubility index (NSI), for example, of less than about 15% by weight. Further, it has the outstanding characteristics of retaining or binding water much like a sponge without assuming a highly viscous or gummy form in coarsely ground meat products.

"GL–301" concentrate referred to herein

A soy protein concentrate made in accordance with U.S. Pat. 2,881,076, known as "GL–301" concentrate, is made commercially (although it is made in a continuous manner, the quantities herein mentioned shall consider the processing to be a batch operation), for example, by suspending 45 lbs. of defatted soybean flour, such as Soy Flour I 200 (A. E. Staley Manufacturing Company) having a minimum protein content of 50% by weight and minimum nitrogen solubility index (NSI) of 40% by weight (NSI values or references set forth herein, including the claims, are based on the procedure of Test 1, below) in a mixing tank having 17 gals. of water and 0.225 lb. of sodium bisulfite. Sufficient 22° Bé. hydrochloric acid is added to the tank to bring the pH of the slurry to about 4.2–4.5. The slurry is stirred for about 30 minutes.

The slurry is then passed over a Door-Oliver rotary vacuum filter and is washed with about 5.5 gals. of water while the rotary vacuum drum rotates. The partially washed, soy protein material is diluted with about 15-20 gals. of water and is passed over a second Door-Oliver rotary vacuum filter and is washed with 7.5 gals. of water while the rotary drum rotates.

The recovered slurry has about 20% by weight solids, at least about 70% by weight protein on a dry basis, and a pH of about 4.2-4.5.

The slurry is heated while being agitated to about 160-180° F. for about 30 minutes. The pH of the resulting heated slurry is neutralized at a pH of about 6.5-7.3 with a 5-50% by weight solution of sodium hydroxide.

The neutralized, soy protein concentrate is dried in a Blaw-Knox spray drier having an air inlet and an air outlet temperature of about 550-600° F. and about 180-200° F., respectively.

The dried, neutralized, soy protein concentrate has a nitrogen solubility index (NSI), for example, of about 45-70% by weight or somewhat lower, and passes through a 100-mesh screen and has poor texture.

These process conditions have been varied in some instances.

The "GL-301" concentrate is particularly well-suited for use in meat emulsions such as sausage or frankfurter products and luncheon meats.

Protein meal used in the examples

In the examples, below, two commercial types of soybean grits were used, namely, 50% Protein Solvent Extracted Dehulled Soybean Meal (Cargill, Incorporated) and Coarse I Soy Grits or Flakes (A. E. Staley Manufacturing Company). These two products will be hereinafter referred to as "Cargill" grits and "Staley" grits, respectively. The Cargill grits have a lower protein content than Staley grits.

Cargill and Staley grits were used in Examples I-III and V, and Examples IV, VII and VIII, respectively.

Laboratory analyses of certain samples of Cargill and Staley flakes (herein referred to as Cargill and Staley grits) are shown in Tables B and C, respectively, below:

TABLE B.—Cargill Grits

| | Percent by weight |
|---|---|
| Moisture | 7.0 |
| Protein content based on moist grits | 50.7 |
| Protein content based on dry grits | 54.5 |
| Nitrogen solubility index | 70.8 |

TABLE C.—Staley Grits [1]

| | Percent by weight |
|---|---|
| Moisture | 7.6 |
| Protein content based on moist grits | 54.8 |
| Protein content based on dry grits | [2] 59.3 |
| Nitrogen solubility index | 53.1 |

[1] pH of about 6.88.
[2] Often about 57-58%.

In Example XV, below, defatted, coarsely ground, peanut meal was used having the analysis shown in Table D, below:

TABLE D.—Defatted, Coarsely Ground, Peanut Meal [1]

| | Percent by weight |
|---|---|
| Moisture | 5.2 |
| Protein content based on moist meal | 59.2 |
| Protein content based on dry meal | 62.4 |
| Nitrogen solubility index | 85.3 |

[1] pH of about 6.9.

Flash drying units referred to in examples

The vertical, pilot plant, fluid bed drier, and ring drier, all of which are dynamic or flash driers, were used in (a) Examples I-III, IV and V (sample 4 of V, VII and VIII, and XV, and (b) Example V (samples 2-4), respectively.

The vertical, pilot plant, fluid bed drier referred to herein comprises an elongated, vertically extending chamber having a rectangular cross-section. The chamber is separated into upper and lower sections by a horizontally extending grid or screen. An air inlet pipe communicates with the lower section of the chamber, and a horizontally extending, air and material outlet pipe and a driven screw conveyor each communicate with opposed walls of the upper portion of the chamber. The top of the upper portion of the chamber leads to the stack.

In operation, a gas heater and fan continuously heat and propel air into the lower portion of the chamber through the air inlet pipe. The air passes through the grid to the wet, vegetable protein material which has been fed continuously into the upper portion of the chamber by the screw conveyor and has fallen onto the grid. The material is lifted off the grid by the hot air as the material becomes lighter from moisture removal. When sufficient drying has occurred, the weight of the lifted material is propelled by a portion of discharged air out of the upper portion of the chamber through the outlet pipe. The remaining portion of spent air and moisture escape vertically from the upper chamber to the stack.

The air inlet and outlet temperatures were measured before the heated air enters the lower portion of the chamber and in the upper portion of the chamber, respectively. In some instances, the temperature of the hot air in the lower portion of the chamber was measured. The temperature of the heated, dried material was measured shortly after being discharged through the outlet pipe and collected.

A suitable horizontal, fluid bed drier (W. Richard Witte & Co.) which may be used includes a substantially horizontally extending, rectangular, fine-mesh screen which rapidly vibrates or reciprocates longitudinally a short distance. A 5-mesh screen is positioned at the discharge end of the vibrating screen. Wet, vegetable protein material which is to be dried is fed continuously to the vibrating screen form the other end of that screen. An open-ended, air manifold chamber encloses the elongated bottom, sides and top of the vibrating screen. A plurality of longitudinally spaced-apart, air inlet pipes communicate with the lower side of the manifold chamber which is positioned below the vibrating screen. Longitudinally spaced-apart, air outlet pipes communicate with the top of the manifold chamber positioned above the vibrating screen.

In operation, a gas heater and fan continuously heat and propel air through the air inlet pipes to the manifold chamber. The air passes through the vibrating screen to the wet material which have been fed to and placed on that screen. The spent, heated air is discharged from the manifold through the air outlet pipes. As the material is dried, the reciprocating vibration and incoming wet material assist in enabling the material being dried to move longitudinally to and ultimately through the 5-mesh screen, and the dried material is collected below that screen.

The air inlet and outlet temperatures may be measured before the heated air enters the manifold chamber and in the manifold chamber above the vibrating screen, respectively. The temperature of the heated, dried material may be measured shortly after the material passed through the 5-mesh screen and was collected.

The ring dried (Barr and Murphy Ltd.) referred to herein comprises a pipe with an essentially figure "8" configuration having a feed loop and recirculating loop. Steam-heated air is propelled by a fan into the inlet end of a relatively short, substantially straight portion of the feed loop. The wet, vegetable protein material is fed downstream into that portion of the feed loop. The air-propelled, wet material is advanced counterclockwise around the first turn of the feed loop to a first conduit in a manifold positioned approximately at the center of the figure "8" configuration and then to the recirculating loop. The material is then propelled clockwise around the second turn (first turn of recirculating loop) back to the manifold, and enters another conduit therein.

If the material is not dried sufficiently, centrifugal force urges the material outwardly through a manifold gap into the first conduit and back into and through the recirculating loop. When sufficient moisture has been removed from the material, the material continues to move through the second mentioned conduit centrifugally inwardly of the manifold gap to a discharge pipe which leads to a cyclone separator. The partly dried material is collected after being discharged from the separator.

The size of the manifold gap can be adjusted. This adjustment in turn adjusts the relative size of the conduits in the manifold leading to the discharge pipe and recirculating loop. As pointed out in Example V (see Table V A in that example), some breakdown, for example, of defatted soybean grits, occurs in the ring drier, thereby causing some breakdown of their natural structure and texture during the drying sequence, and the amount of such breakdown or comminution can be varied by adjusting the size of the manifold gap.

The air inlet temperature was measured between the air inlet end of the feed loop and the point where the wet material is introduced into that loop. The air outlet temperature was measured shortly before the discharge pipe communicated with the cyclone separator. The temperature of the partly dried material was measured shortly after being discharged from the cyclone separator and collected.

The following examples are for purposes of illustration only, and our invention is not necessarily limited thereto. In some instances, the examples indicate or suggest process conditions which should be avoided in obtaining concentrates having high nitrogen solubility index (NSI) values (e.g., see Example XIII (sample 2b). In these examples, the absence of values under a particular column of a table sometimes indicates no values were recorded. The analyses appearing in tables of the examples and the viscosity determinations made in the examples were made after grinding the concentrates in those instances where the concentrates would not otherwise pass through a 100-mesh screen. The indicated temperature readings for the vertical, fluid bed drier and ring drier were taken at the locations mentioned in the description of these driers set forth above. The samples of "GL-301" or "Patti-Pro" concentrates used for comparison purposes were not necessarily produced from the same production run.

Example I-V, VII and VIII, below concern the production of soy protein concentrates having natural structure and texture with the use of pre- and post-neutralization drying, although Example V shows both the use and omission of preneutralization drying. Examples IX-XIV involve subjecting soy protein material to terminal bacterial control. Example XV concerns the production of a peanut protein concentrate with the use of pre- and post-neutralization drying, and, if desired, subdividing the dried concentrate.

Tables E-G, below, and comments concerning them summarize much of data set forth in the examples.

EXAMPLE I

An aqueous, isoelectric, soy protein slurry was prepared with the following materials:

| | | |
|---|---|---|
| Cargill grits | lbs | 10 |
| Water | gals | 6.8 |
| Sodium bisulfite | lb | 0.05 |
| 22° Bé. hydrochloric acid | lb | 0.568 |

The above slurry was agitated for 30 minutes and was found to have a pH of 4.15. The slurry was centrifuged in a Tolhurst basket centrifuge having a 12-in. diameter basket. The insoluble, soy protein cake was reslurried with 4.7 gals. of water (considered a washing step), was again centrifuged in the Tolhurst basket centrifuge, and was washed with an additional 2.1 gals. of water while being centrifuged. The wet, insoluble, washed, soy protein concentrate contained 71.3% by weight moisture and constituted a yield, on a dry basis, of 67.4% by weight.

The wet, soy protein concentrate was partly dried in a vertical, pilot plant, fluid bed drier. The operating conditions in this first drying step were as shown in Table IA, below:

TABLE I A.—FIRST STAGE DRYING WITH VERTICAL, PILOT PLANT, FLUID BED DRIER

| Length of time fluid bed drier was operated | Air inlet temperature, °F. | Air in lower chamber, °F. | Air outlet temperature, °F. | Temperature of partly dried product, °F. |
|---|---|---|---|---|
| 0 (start of run) | 222 | 202 | 209 | |
| 5 min | 231 | 113 | 104 | |
| 10 min | 221 | 104 | 98 | 92 |
| 15 min | 224 | 101 | 98 | 92 |
| 20 min | 225 | 100 | 99 | 93 |
| 23 min. (air heater cut off) | | | 85 | |
| 25 min. (stopped collecting product) | | | 80 | 80 |

The recovered, partly dried, soy protein concentrate which weighed 4.1 lbs. and had 35.8% by weight moisture, was placed in a ribbon blender with 6% by weight sodium bicarbonate based on the solids. The sodium bicarbonate was readily mixed with the concentrate without forming a viscous or gummy mass. The neutralized, soy protein concentrate had a pH of 7.4.

The neutralized concentrate was dried in the vertical, pilot plant, fluid bed drier under the conditions shown in Table I B, below:

TABLE I B.—SECOND STAGE DRYING WITH VERTICAL PILOT PLANT, FLUID BED DRIER

| Length of time fluid bed drier was operated | Air inlet temperature, °F. | Air outlet temperature, °F. | Temperature of dried product, °F. |
|---|---|---|---|
| 0 (start of run) | 256 | 239 | |
| 2 min | 260 | 206 | 130 |
| 3 min | 257 | 200 | 130 |
| 4 min | 257 | 195 | 130 |
| 5 min | 257 | 198 | 135 |
| 6 min. (air heater cut off) | 170 | 167 | 156 |
| 9 min | | 127 | 98 |

The neutralized concentrate from the second drying step was blended and was found to have 10.8% by weight moisture. The second drying of the concentrate was continued from 5 minutes in the vertical, pilot plant, fluid bed dried under the conditions shown in Table I C, below:

TABLE I C.—CONTINUATION OF SECOND STAGE DRYING WITH VERTICAL, PILOT PLANT, FLUID BED DRIER

| Length of time fluid bed drier was operated | Air inlet temperature, °F. | Air outlet temperature, °F. | Temperature of dried product, °F |
|---|---|---|---|
| 5 additional min | 120-198 | 115-143 | 102-126 |

The moisture content of the neutralized concentrate from the continuation of the second drying step was 7.9% by weight, and a portion of it was ground in a laboratory Fitz Mill so as to pass through a 103-mesh screen.

The analysis of the ground, dried, neutralized, soy protein concentrate (after the continuation of the second drying step) was as shown in Table I D, below:

TABLE I D.—DRIED, NEUTRALIZED, SOY PROTEIN CONCENTRATE [1]

| | Percent by weight |
|---|---|
| Moisture | 7.2 |
| Protein content based on dried neutralized concentrate | 64.3 |
| Protein content based on 100% dried neutralized concentrate | 69.3 |
| Nitrogen Solubility Index (NSI) | 43.5 |

[1] pH was 7.7.

The unground, neutralized concentrate having natural structure and texture from the continuation of the second drying step and a "Patti-Pro" concentrate were each separately mixed with water in the ratio of 1 oz. of concentrate to 3 oz. of water, were tested for water-absorption and water-retention (not in accordance with Tests 2 and 3, above), and the comparative results of these tests are shown in Table I E, below:

TABLE I E.—WATER-ABSORPTION AND WATER-RETENTION

| "Patti-Pro" concentrate | Concentrate of this example |
|---|---|
| Immediately upon adding the water, the concentrate absorbed the water and swelled. | Upon adding the water, the concentrate did not absorb water immediately; however, in 1 min., the concentrate absorbed water and swelled. |
| After 30 min. of soaking, the concentrate was squeezed in the hand, and a substantial quantity of water was readily squeezed therefrom. | After 30 min. of soaking, the concentrate was squeezed in the hand, and substantially no water was squeezed therefrom. |

The unground, neutralized concentrate from the continuation of the second drying step, a "Patti-Pro" concentrate, and Cargill grits were each separately tested for cold water- and hot water-absorption as stated in Tests 2 and 3, above. The results of these tests are shown in Table I F, below:

TABLE I F.—WATER-ABSORPTION

| | Cold water-absorption, percent | Hot water-absorption, percent |
|---|---|---|
| Cargill grits | 126 | 234 |
| "Patti-Pro" concentrate | 144 | 233 |
| Concentrate of this example | 225 | 242 |

The neutralized concentrate from the continuation of the second drying step which was ground in a laboratory Fitz Mill so as to pass through a 100-mesh screen and a "GL-301" concentrate were each separately mixed with water in a weight ratio of about 1 to 3. The "GL-301" concentrate formed a dry heavy paste. The concentrate of this example formed a very heavy paste which did not appear to be as dry as the "GL-301" concentrate.

The viscosity of these two concentrates was determined as shown in Test 4, above, at 10% by weight solids. The pH values were also determined and adjusted, as needed, to comparable values. The results of these tests are shown in Table I G, below:

TABLE I G.—VISCOSITY AND pH

| | Viscosity in centipoises | pH |
|---|---|---|
| "GL-301" concentrate | 48 | 6.49 |
| Concentrate of this example | 232 | a 6.48 | a Lowered from 7.7 with 1 N HCl.

EXAMPLE II

An aqueous, isoelectric, soy protein slurry was prepared with the following materials:

| | | |
|---|---|---|
| Cargill grits | lbs | 10 |
| Water | gals | 6.8 |
| Sodium bisulfite | lb | 0.05 |
| 22° Bé. hydrochloric acid | lb | 0.568 |

The above slurry was agitated for 30 minutes and was found to have a pH of 4.15. The slurry was centrifuged in a Tolhurst basket centrifuge having a 12-in. diameter basket. The insoluble, soy protein cake was reslurried with 4.7 gals. of water (considered a washing step), was again centrifuged in the Tolhurst basket centrifuge, and was washed with an additional 2.1 gals. of water while being centrifuged. The wet, insoluble, washed soy protein concentrate contained 67.6% by weight moisture and constituted a yield, on a dry basis, of 56.7% by weight.

The wet, soy protein concentrate was partly dried in a vertical, pilot plant, fluid bed drier. The operating conditions in this first drying step were as shown in Table II A, below:

TABLE II A.—FIRST STAGE DRYING WITH VERTICAL, PILOT PLANT, FLUID BED DRIER

| Length of time fluid bed drier was operated | Air inlet temperature, °F. | Air in lower chamber, °F. | Air outlet temperature, °F. | Temperature partly dried product, °F. |
|---|---|---|---|---|
| 0 (start of run) | 227 | 211 | 219 | |
| 5 min | 226 | 112 | 110 | |
| 10 min | 232 | 105 | 102 | 95 |
| 18 min. (air heater cut off) | 227 | 106 | 109 | 103 |
| 20 min | 134 | | 104 | 98 |
| 22 min. (stopped collecting product) | | | | |

The recovered, partly dried, soy protein concentrate weighed 3.68 lbs. on a dry basis, and had 23% by weight moisture. The moisture content of the concentrate was raised to 30% by weight, and the resulting concentrate was placed in a ribbon blender with 2.5% by weight sodium carbonate based on the solids. The sodium carbonate was readily mixed with the concentrate without forming a viscous or gummy mass. The neutralized, soy protein concentrate had a pH of 6.8.

The neutralized concentrate was dried in the vertical, pilot plant, fluid bed drier under the conditions shown in Table II B, below:

TABLE II B.—SECOND STAGE DRYING WITH VERTICAL PILOT PLANT, FLUID BED DRIER

| Length of time fluid bed drier was operated | Air inlet temperature, °F. | Air outlet temperature, °F. | Temperature of dried product |
|---|---|---|---|
| 0 (start of run) | 230 | 220 | Max. temp. of 122° F. |
| 5 min | 224 | 162 | |
| 10 min. (air heater cut off) | | | |

The concentrate having natural structure and texture from the second drying step had 8.7% by weight moisture and 2.81 lbs. of concentrate was recovered.

A portion of concentrate recovered from the second drying step was ground in a laboratory Fitz Mill so that the ground concentrate would pass through a 100-mesh screen. 2 lbs. of ground concentrate were recovered.

The analysis of the ground, dried, neutralized, soy protein concentrate was as shown in Table II C, below:

TABLE II C.—DRIED, NEUTRALIZED SOY PROTEIN CONCENTRATE

| | Percent by weight |
|---|---|
| Moisture | 7.0 |
| Protein content based on dried neutralized concentrate | 66.3 |
| Protein content based on 100% dried neutralized concentrate | 71.3 |
| Nitrogen Solubility Index (NSI) | 64.4 |

The unground portion of the neutralized concentrate from the second drying step, a "Patti-Pro" concentrate, and Cargill grits were each separately tested for cold water-absorption and hot water-absorption as shown in Tests 2 and 3, above. The results of these tests are shown in Table II D, below:

TABLE II D.—WATER-ABSORPTION

| | Cold water-absorption, percent | Hot water-absorption, percent |
|---|---|---|
| Cargill grits | 120 | 224 |
| "Patti-Pro" concentrate | 145 | 195 |
| Concentrate of this example | 187 | 248 |

The neutralized concentrate from the second drying step which was ground in a laboratory Fitz Mill so as to pass through a 100-mesh screen and a "GL-301" concentrate were each separately mixed with water in a weight ratio of about 1 to 3. The resulting "GL-301" concentrate formed a drier mass than did the concentrate of this example. These two concentrates were each mixed with water to provide 10% by weight solids. The pH was adjusted, as needed, to the vicinity of about 7.0.

The viscosity of these two concentrates were determined as shown in Test 4, above, at 10% by weight solids. The results of these tests are shown in Table II E, below:

TABLE II E.—VISCOSITY

| | Viscosity in centipoises |
|---|---|
| "GL–301" concentrate | 77 |
| Concentrate of this example | 108 |

The ground neutralized concentrate from the second drying step was mixed with water to provide 5% by weight solids. The taste was considered to be good due to removal of beany taste.

EXAMPLE III

An aqueous, isoelectric, soy protein slurry was prepared with the following materials:

| | | |
|---|---|---|
| Cargill grits | lbs | 10 |
| Water | gals | 6.8 |
| Sodium bisulfite | lb | 0.05 |
| 22° Bé. hydrochloric acid | lb | 0.568 |

The above slurry was agitated for 30 minutes. The slurry was centrifuged in a Tolhurst basket centrifuge having a 12-in. basket. The insoluble, soy protein cake was reslurried with 4.7 gals. of water (considered a washing step), and was washed on the Tolhurst basket centrifuged. The wet, insoluble, washed soy protein concentrate contained 69.3% by weight moisture and constituted a yield, on a dry basis, of 66.7% by weight.

The wet, soy protein concentrate was partly dried in a vertical, pilot plant, fluid bed drier. The operating conditions in this first drying step were as shown in Table III A, below:

TABLE III A.—FIRST STAGE DRYING WITH VERTICAL, PILOT PLANT, FLUID BED DRIER

| Length of time fluid bed drier was operated | Air inlet temperature, °F. | Air in lower chamber, °F. | Air outlet temperature, °F. | Temperature of partly dried product, °F. |
|---|---|---|---|---|
| 0 (start of run) | 220 | 202 | 214 | |
| 6 min | 225 | 106 | 102 | |
| 9 min | 220 | 102 | 98 | 93 |
| 12 min | 222 | | 98 | 94 |
| 18 min | 221 | 100 | 98 | 93 |
| 20 min. (stopped collecting pro product) | 226 | | 101 | |

The recovered, partly dried, soy protein concentrate which weighed 4.9 lbs. and had 37.5% by weight moisture, was mixed by hand with a 25% by weight solution of sodium hydroxide until 2% by weight sodium hydroxide, based on the solids, was added. The sodium hydroxide was readily mixed with the concentrate without forming a viscous or gummy mass. The neutralized, soy protein concentrate had a pH of about 6.95—7.2.

The neutralized concentrate was dried in the vertical, pilot plant, fluid bed drier under the conditions shown in Table III B, below:

TABLE III B.—SECOND STAGE DRYING WITH VERTICAL, PILOT PLANT, FLUID BED DRIER

| Length of time fluid bed drier was operated | Air inlet temperature, °F. | Air in lower chamber, °F. | Air outlet temperature, °F. | Temperature of dried product, °F. |
|---|---|---|---|---|
| 0 (start of run) | 212 | 200 | 215 | |
| 3 min | 210 | 140 | 146 | 94 |
| 7 min. (air heater cut off) | 150 | 140 | 143 | 110 |
| 10 min | 111 | 111 | 113 | 109 |
| 13 min. (stopped collecting product) | | | | |

The neutralized concentrate from the second drying step had natural structure and texture, had 10.3% by weight moisture, and reached a moisture content of 6.2% by weight upon drying overnight under room conditions. This concentrate was subjected to terminal bacterial control in Example IX, below.

The major portion of the resulting dried neutralized concentrate was ground in a laboratory Fitz Mill so that the ground concentrate passed through a 100-mesh screen.

The ground neutralized concentrate was analyzed as shown in Table III C, below:

TABLE III C.—DRIED, NEUTRALIZED, SOY PROTEIN CONCENTRATE

| | Percent by weight |
|---|---|
| Moisture | 6.2 |
| Protein content based on dried neutralized concentrate | 66.3 |
| Protein content based on 100% dried neutralized concentrate | 70.7 |
| Nitrogen Solubility Index (NSI) | 59.8 |

The ground neutralized concentrate from the second drying step and a "GL–301" concentrate were each separately mixed with water in a weight ratio of about 1 to 3. The concentrate of this example formed a heavy, thick paste, but the "GL–301" concentrate formed a heavier, thicker paste.

Viscosity and pH determinations were made after adding water to separate portions of the ground neutralized concentrate from the second drying step and a "GL–301" concentrate to provide samples having a 10% by weight solids. The viscosity determinations were made as shown in Test 4, above. The results of these tests are shown in Table III D, below:

TABLE III D.—VISCOSITY AND pH

| | Viscosity in centipoises | pH |
|---|---|---|
| "GL–301" concentrate | 69.8 | 6.99 |
| Concentrate of this example | 106.0 | 6.74 |

EXAMPLE IV

An aqueous, isoelectric, soy protein slurry was prepared with the following materials:

| | | |
|---|---|---|
| Staley grits | lbs | 20 |
| Water | gals | 13.6 |
| Sodium bisulfite | lb | 0.1 |
| 22° Bé. hydrochloric acid | lbs | 1.14 |

The above slurry was agitated for 30 minutes and was found to have a pH of 4.4. The slurry was centrifuged in a Tolhurst basket centrifuge having a 12-in. basket. The insoluble, soy protein cake was reslurried with 9.4 gals. of water (considered a washing step), was again centrifuged in the Tolhurst basket centrifuge, and was washed with an additional 4.2 gals. of water while being centrifuged. The wet, insoluble, washed, soy protein concentrate weighed 42 lbs., contained 65.8% by weight moisture, and constituted a yield, on a dry basis, of 67% by weight.

The wet, soy protein concentrate was partly dried in a vertical, pilot plant, fluid bed drier. The operating conditions in this first drying step were as shown in Table IV A, below:

TABLE IV A.—FIRST STAGE DRYING WITH VERTICAL PILOT PLANT, FLUID BED DRIER

| Length of time fluid bed drier was operated | Air inlet temperature, °F. | Air in lower chamber, °F. | Air outlet temperature, °F. | Temperature of partly dried product, °F. |
|---|---|---|---|---|
| 0 (start of run) | 213 | 202 | 206 | |
| 7 min | 218 | 103 | 104 | 94 |
| 21 min | 211 | 96 | 96 | 93 |
| 33 min | 214 | 98 | 98 | 94 |
| 46 min | 216 | 102 | 105 | 98 |

The recovered, partly dried, soy protein concentrate, which weighed 14 lbs. and had 32.8% by weight moisture, was placed in a ribbon blender and was sprayed with a 25% by weight solution of sodium hydroxide to provide 2% by weight sodium hydroxide based on the solids. The sodium hydroxide was readily mixed with the concentrate without forming a viscous or gummy mass. The neutralized, soy protein concentrate had a pH of about 7.2–8.0.

The neutralized concentrate was dried in the vertical, pilot plant, fluid bed drier under the conditions shown in Table IV B, below:

TABLE IV B.—SECOND STAGE DRYING WITH VERTICAL, PILOT PLANT, FLUID BED DRIER

| Length of time fluid bed drier was operated | Air inlet temperature, °F. | Air in lower chamber, °F. | Air outlet temperature, °F. | Temperature of dried product, °F. |
|---|---|---|---|---|
| 0 (start of run) | 214 | 200 | 206 | |
| 7 min | 194 | 122 | 126 | 116 |
| 11 min | 194 | 116 | 118 | 114 |

The neutralized concentrate having natural structure and texture from the second drying step had about 10–15% by weight moisture. The second drying of the concentrate was continued for 8 additional minutes in the vertical, pilot plant, fluid bed drier under the conditions shown in Table IV C, below:

TABLE IV C.—CONTINUATION OF SECOND STAGE DRYING, WITH VERTICAL, PILOT PLANT, FLUID BED DRIER

| Length of time fluid bed drier was operated | Air inlet temperature, °F. | Air in lower chamber, °F. | Air outlet temperature, °F. | Temperature of dried product, °F. |
|---|---|---|---|---|
| 13 min | 194 | 130 | 133 | 129 |
| 15 min. (air heater cut off) | | 120 | 120 | 120 |
| 17 min | | 115 | 115 | 115 |
| 9 min | | 110 | 110 | 108 |

The dried neutralized concentrate weighed 8 lbs. 5 oz. and had 9.9% by weight moisture, and was ground in a laboratory Fitz Mill so as to pass through a 100-mesh screen. The dried but unground concentrate was tested for water-absorption and viscosity characteristics in Example VI, below.

The analysis of the dried, neutralized, soy protein concentrate was as shown in Table IV D, below:

TABLE IV D.—DRIED, NEUTRALIZED, SOY PROTEIN CONCENTRATE

| | Percent by weight |
|---|---|
| Moisture | 10.0 |
| Protein content based on dried neutralized concentrate | 66.6 |
| Protein content based on 100% dried neutralized concentrate | 74.0 |
| Nitrogen Solubility Index (NSI) | 62.8 |

Example V

An aqueous, isoelectric, soy protein slurry was prepared with the following materials (the quantities of material mentioned below are based upon considering the operation a batch operation instead of a continuous one):

| | | |
|---|---|---|
| Cargill grits | lbs | 500 |
| Water | gals | 333.3 |
| Sodium bisulfite | lbs | 2.5 |
| 22° Bé hydrochloric acid | lbs | 28.5 |

The above slurry was agitated for 30 minutes. The slurry was dewatered in a Sweco Vibro-Energy Separator. The insoluble, soy protein cake was reslurried with about 225–240 gals. of water. The slurry was centrifuged in a Mercone Centrifuge. The wet, insoluble, washed, soy protein concentrate contained 71.8% by weight moisture and had a pH of 3.9.

A portion of the concentrate was put aside for later neutralization and will be referred to as sample 1.

The remaining portions of wet, soy protein concentrate was divided into samples 2 and 3. Samples 2 and 3 were separately hand-fed with a scoop to a ring drier (Barr & Murphy Ltd.) which partly dried the two samples of the concentrate in separate runs. The operating conditions in this first drying step were as shown in Table V A, below:

TABLE V A.—FIRST STAGE DRYING OF SAMPLES 2 AND 3 WITH RING DRIER

| | Manifold gap, in. | Temp., °F. Air Inlet | Temp., °F. Air outlet | Temperature of partly dried product, °F. | Moisture content of partly dried product, percent |
|---|---|---|---|---|---|
| Sample 2 | ½ | 355 | 150 | 80 | 33.3 |
| Sample 3 | ¼ | 350 | 135–150 | 80 | 43.4 |

A larger fraction of the concentrate was recycled in the recirculating loop when the manifold gap was ½ in. and there was a greater break-down of the natural structure and texture of the grits. It was found that the use of a ¼ in. manifold gap decreased the breakdown of the grits, but resulted in a higher moisture content.

Undried sample 1 and the two samples of recovered, partly dried, soy protein concentrate, samples 2 and 3, were each separately placed in a ribbon blender and were separately neutralized with sodium hydroxide. A 25% by weight solution was sprayed onto the samples until 2% by weight of sodium hydroxide, based on the solids, was added. The sodium hydroxide was readily mixed with the samples 2 and 3 without forming a viscous or gummy mass; however, the neutralization of undried sample 1 produced a viscous or gummy mass which caused a break-down of natural structure and texture. Samples 2 and 3 of neutralized, soy protein concentrate had a pH of 7.5 and 7.0–7.1, respectively.

After neutralization, sample 4, which was a portion of neutralized sample 3, was separated from sample 3.

Neutralized samples 1, 2 and 3 were air-dried.

Sample 4, which weighed 18 lbs. 4 oz., was dried in the vertical, pilot plant, fluid bed drier under the conditions shown in Table V B, below:

TABLE V B.—SECOND STAGE DRYING OF SAMPLE 4 IN VERTICAL, PILOT PLANT, FLUID BED DRIER

| Length of time fluid bed drier was operated | Air inlet temperature, °F. | Air in lower chamber, °F. | Air outlet temperature, °F. | Temperature of partly dried product, °F. |
|---|---|---|---|---|
| 0 (start of run) | 222 | 213 | 212 | |
| 4 min | 229 | 127 | 127 | 115 |
| 8 min | 227 | 123 | 123 | 120 |
| 14 min | 219 | 123 | 122 | 120 |

Dried, neutralized, sample 4 concentrate had natural structure and texture 10–15% by weight moisture and was further dried for six minutes in the vertical pilot plant, fluid bed drier under the conditions of Table V C, below:

TABLE V C.—CONTINUATION OF SECOND STAGE DRYING OF SAMPLE 4 IN VERTICAL, PILOT PLANT, FLUID BED DRIER

| Length of time fluid bed drier was operated | Air inlet temperature, °F. | Air in lower chamber, °F. | Air outlet temperature, °F. | Temperature of partly dried product, °F. |
|---|---|---|---|---|
| 15 min. (air heater cut off) | | 138 | 142 | 123 |
| 20 min | 114 | 108 | 106 | 100 |

The water-absorption and viscosity characteristics of sample 4 were tested in Example VI, below.

The samples were ground in a laboratory Fitz Mill so as to pass through a 100-mesh screen. The analyses of the four, dried neutralized samples were as shown in Table V D, below:

were tested, the concentrate of Example IV was at least as good and were probably somewhat better than the

TABLE V D.—DRIED, NEUTRALIZED, SOY PROTEIN CONCENTRATE

|  | Neutralized and air-dried, Sample 1,[a] percent | Partly dried, neutralized and air-dried, Sample 2,[b] percent | Partly dried, neutralized and air-dried, Sample 3,[c] percent | Partly dried neutralized and fluid bed-dried, Sample 4,[a] percent |
|---|---|---|---|---|
| Moisture | 9.7 | 6.4 | 6.7 | 7.9 |
| Protein content based on dried neutralized concentrate | 62.0 | 62.1 | 63.3 | 62.0 |
| Protein content based on 100% dried neutralized concentrate | 68.7 | 66.3 | 67.8 | 67. |
| Nitrogen Solubility Index (NSI) | 60.8 | 62.8 | 64.1 | 68.3 |

[a] Slurry had 71.8% by weight moisture before neutralization.
[b] Had 33.3% by weight moisture after being dried in the ring drier.
[c] Had 43% by weight moisture after being dried in the ring drier.

Sample 4 was stored and subjected to terminal bacterial control in Example X, below.

EXAMPLE VI

The dried, unground, neutralized concentrates of Example IV, sample 4 of Example V, all of which had natural structure and texture, and a "Patti-Pro" concentrate were tested for cold-water and hot water-absorption as stated in Tests 2 and 3, above. The results of these tests are shown in Table VI A, below:

TABLE VI A.—WATER-ABSORPTION

|  | Percent | |
|---|---|---|
|  | Cold water-absorption | Hot water-absorption |
| Dried neutralized concentrate of Example IV | 178 | 226 |
| Dried neutralized concentrate of Sample 4 of Example V | 219 | 236 |
| "Patti-Pro" concentrate | 155 | 200 |

The above-mentioned first three concentrates were each separately ground so as to pass through a 100-mesh screen. The viscosity of each of these concentrates and "GL-301" concentrate was determined as shown in Test 4, above, at 10% by weight solids. The pH of the resulting slurries was adjusted to about 6.9-7.0. The results of these viscosity tests are shown in Table VI B, below:

TABLE VI B.—VISCOSITY

|  | Viscosity in centipoises |
|---|---|
| Dried neutralized concentrate of Example IV | 285 |
| Dried neutralized concentrate of sample 4 of Example V | 187 |
| "GL-301" concentrate | 66 |

The above three dried neutralized concentrates tested in Table VI B (the first three concentrates were ground so as to pass through a 100-mesh screen) were mixed with water in a weight ratio of 1 to 3.

The viscosity of the dried neutralized concentrate of Example IV was ground so as to pass through a 100-mesh screen and was compared with a "GL-301" concentrate when tested (in accordance with Test 4, above, at specified solids content) at three levels of percent solids. The pH of each suspension was adjusted to about 6.85-7.0. The results of these tests are shown in Table VI C, below:

TABLE VI C

|  | Viscosity in centipoises | | |
|---|---|---|---|
|  | 7.5% by weight solids | 12.5% by weight solids | 15% by weight solids |
| Dried neutralized concentrate of Example IV | 57 | 1,250 | No flow. |
| "GL-301" concentrate | 17 | 220 | Very thick (about 3,500). |

When 5% by weight samples of the dried neutralized concentrate of Example IV and "GL-301" concentrate "GL-301" concentrate, as evidenced by somewhat less beany flavor.

EXAMPLE VII

An aqueous, isoelectric, soy protein slurry was prepared with the following materials:

| Staley grits | lbs | 10 |
|---|---|---|
| Water | gals | 6.8 |
| Sodium bisulfite | lb | 0.05 |
| 22° Bé. hydrochloric acid | lb | 0.568 |

The above slurry was agitated for 30 minutes and was found to have a pH of 4.3. The slurry was centrifuged in a Tolhurst basket centrifuge having a 12-in. diameter basket. The insoluble, soy protein cake was reslurried with 4.7 gals. of water (considered a washing step), was again centrifuged in the Tolhurst basket centrifuge, and was washed with an additional 2.1 gals. of water while being centrifuged. The wet, insoluble, washed, soy protein concentrate weighed 20 lbs. 6 oz., contained 67% by weight moisture and constituted a yield, on a dry basis, of 67.3% by weight.

The wet, soy protein concentrate was partly dried in a vertical, pilot plant, fluid bed drier. The operating conditions in this first drying step were as shown in Table VII A, below:

TABLE VII A.—FIRST STAGE DRYING WITH VERTICAL PILOT PLANT, FLUID BED DRIER

| Length of time fluid bed drier was operated | Air inlet temperature, ° F. | Air in lower chamber, ° F. | Air outlet temperature, ° F. | Temperature of partly dried product, ° F. |
|---|---|---|---|---|
| 25 min | 255-269 | 108-175 | 114-146 | 100-128 |

The recovered, partly dried, soy protein concentrate, which weighed 5.1 lbs. and had 22.6% by weight moisture, was placed in a ribbon blender. A 25% by weight solution of sodium hydroxide was added until 2% by weight sodium hydroxide, based on total soluble, had been added. The sodium hydroxide was readily mixed with the concentrate without forming a viscous or gummy mass.

The neutralized concentrate was dried in the vertical, pilot plant, fluid bed drier under the conditions shown in Table VII B, below:

TABLE VII B.—SECOND STAGE DRYING WITH VERTICAL, PILOT PLANT, FLUID BED DRIER

| Length of time fluid bed drier was operated | Air inlet temperature, ° F. | Air in lower chamber, ° F. | Air outlet temperature, ° F. | Temperature of partly dried product, ° F. |
|---|---|---|---|---|
| 6 min | 245-252 | 178-192 | 170-186 | 122-140 |

The neutralized concentrate having natural structure and texture from the second drying step, which weighed 4 lbs. and had 10% by weight moisture, was ground in a laboratory Fitz Mill so as to pass through a 100-mesh screen.

The analysis of the ground, dried, neutralized, soy protein concentrate was as shown in Table VII C, below:

TABLE VII C.—DRIED NEUTRALIZED, SOY PROTEIN CONCENTRATE

| | % by Weight |
|---|---|
| Moisture | 10.0 |
| Protein content based on dried neutralized concentrate | 67.1 |
| Protein content based on 100% dried neutralized concentrate | 74.6 |
| Nitrogen Solubility Index (NSI) | 52.8 |

The ground, dried, neutralized concentrate was subjected to terminal bacterial control in Example XI, below.

EXAMPLE VIII

Three, separate, aqueous, isoelectric, soy protein slurries were prepared with the following materials:

| | | |
|---|---|---|
| Staley Grits | lbs | 40 |
| Water | gals | 27.2 |
| Sodium bisulfite | lb | 0.2 |
| 22° Bé. hydrochloric acid | lbs | 2.3 |

Each of the three slurries was agitated for 30 minutes and were found to have a pH of about 4.2. Each slurry was centrifuged in a Tolhurst basket centrifuge having a 12-in. diameter basket. The insoluble, soy protein cake from each slurry was reslurried wih 18.8 gals. of water (considered a washing step) and was again centrifuged in the Tolhurst basket contrifuge. The three, wet, insoluble, washed, soy protein concentrates each weighed about 82–90 lbs., contained about 66.7–70.5% by weight moisture and constituted a yield, on a dry basis, of about 66–69% by weight.

The three recovered concentrates are hereinafter referred to as samples 1–3. Although, samples 3 is discussed in added detail below, samples 1 and 2 were treated in a like manner.

Sample 3 had 66.7% by weight moisture.

The wet, soy protein concentrate of sample 3 was partly dried in a vertical, pilot plant, fluid bed drier. The operating conditions in the first drying step were as shown in Table VIII A, below:

TABLE VIII A.—FIRST STAGE DRYING OF SAMPLE 3 WITH VERTICAL, PILOT PLANT, FLUID BED DRIER

| Length of time fluid bed drier was operated | Air inlet temperature, °F. | Air in lower chamber, °F. | Air outlet temperature, °F. | Temperature of dried product, °F. |
|---|---|---|---|---|
| 65 min | 239–251 | 112–158 | 115–145 | 105–113 |

The recovered, partly dried, soy protein concentrate of sample 3, which weighed 33.8 lbs. and had 31.1% by weight moisture, was placed in a ribbon blender. A 25% by weight solution of sodium hydroxide was added until 2% by weight sodium hydroxide, based on total soluble, had been added. The sodium hydroxide was readily mixed with the concentrate without forming a viscous or gummy mass.

The neutralized sample 3 concentrate was dried in the vertical, pilot plant, fluid bed drier under the conditions shown in Table VIII B, below:

TABLE VIII B.—SECOND STAGE DRYING OF SAMPLE 3 WITH VERTICAL, PILOT PLANT, FLUID BED DRIER

| Length of time fluid bed drier was operated | Air inlet temperature, °F. | Air in lower chamber, °F. | Air outlet temperature, °F. | Temperature of partly dried product, °F. |
|---|---|---|---|---|
| 33 min | 204–256 | 128–181 | 129–170 | 127–147 |

The dried, neutralized concentrate of sample 3 from the second drying step had natural structure and texture, weighed 25 lbs. and had 10.8% by weight moisture.

The dried neutralized concentrate was ground in a laboratory Fitz Mill so that it passed through a 100-mesh screen.

The analysis of the ground, dried, neutralized, soy protein concentrate of sample 3 was as shown in Table VIII C, below:

TABLE VIII C.—DRIED, NEUTRALIZED, SOY PROTEIN CONCENTRATE OF SAMPLE 3

| | Percent by weight |
|---|---|
| Moisture | 10.9 |
| Protein content based on dried neutralized concentrate | 65.7 |
| Protein content based on 100% dried neutralized concentrate | 73.6 |
| Nitrogen Solubility Index (NSI) | 47.1 |

The ground concentrates of each of samples 1–3 were subjected to terminal bacterial control in Examples XII, XIII and XIV, respectively.

EXAMPLE IX

In order to obtain terminal bacterial control, dried, neutralized, soy protein concentrate from the second drying stage of Example III, which had 6.2% by weight moisture, and a nitrogen solubility index (NSI) of 59.8% by weight, was heated in an oven for 90 minutes to a final temperature of 208° F. After heating, the nitrogen solubility index (NSI) of the concentrate was 46.8% by weight.

EXAMPLE X

One pound of the ground, dried, neutralized, soy protein concentrate of sample 4 of Example V, which had been contaminated due to, at least in part, lengthy storage and repeated handling, was analyzed as shown in Table X A, below:

TABLE X A.—ANALYSIS OF DRIED NEUTRALIZED CONCENTRATE OF SAMPLE 4 OF EXAMPLE V

| | |
|---|---|
| Moisture | 7.9% by wt. |
| Nitrogen Solubility Index (NSI) | 68.5% by wt. |
| Total bacterial count/gm. | 10,000,000 |
| Thermophiles/10 gms. | 85 |
| Flat sours/10 gms. | 55 |

A 1 lb. portion of sample 4 was placed in the vertical, pilot plant, fluid bed drier after the drier had been preheated and the air temperature therein was 235° F. The material outlet pipe for the dried concentrate was closed, and the concentrate was heated for 15 minutes.

The reheated ground concentrate was then collected, reached a maximum temperature of about 235° F., and was analyzed as shown in Table X B, below:

TABLE X B.—ANALYSIS OF REHEATED, DRIED NEUTRALIZED CONCENTRATE OF SAMPLE 4 OF EXAMPLE V

| | |
|---|---|
| Moisture | 0.7% by wt. |
| Nitrogen Solubility Index (NSI) | 29.9% by wt. |
| Total bacterial count/gm. | 480,000 |
| Thermophiles/10 gms. | 10 |
| Flat sours/10 gms. | 5 |

Example XI

Four pounds of the ground, dried, neutralized, soy protein concentrate of Example VII was analyzed as shown in Table XI A, below:

TABLE XI A.—ANALYSIS OF DRIED NEUTRALIZED CONCENTRATE OF EXAMPLE VII

| | |
|---|---|
| Moisture | 10.0% by wt. |
| Nitrogen Solubility Index (NSI) | 52.8% by wt. |
| Total bacterial count/gm. | 4,150 |
| Thermophiles/10 gms. | 1,010 |
| Flat sours/10 gms. | 525 |

The concentrate was placed in the vertical, pilot plant, fluid bed drier after the drier had been pre-heated and the air temperature therein was 220–230° F. The material outlet pipe for the reheated concentrate was kept open, and the concentrate was dried for 4 minutes. The reheated concentrate was ejected at a rate of about 1 lb./min. The concentrate reached a maximum temperature of about 166° F.

The ground reheated concentrate was then analyzed as shown in Table XI B, below:

TABLE XI B.—ANALYSIS OF REHEATED, DRIED NEUTRALIZED CONCENTRATE OF EXAMPLE VII

Moisture _____ 6.1% by wt.
Nitrogen Solubility Index (NSI) _____ 53.6% by wt.
Total bacterial count/gm. _____ 1,140
Thermophiles/10 gms. _____ 650
Flat sours/10 gms. _____ 405

EXAMPLE XII

One pound of the ground, dried, neutralized, soy protein concentrate of sample 1 of Example VIII was analyzed as shown in Table XII A, below:

TABLE XII A.—ANALYSIS OF DRIED NEUTRALIZED CONCENTRATE OF SAMPLE 1 OF EXAMPLE VIII

Moisture _____ 9.9% by wt.
Nitrogen Solubility Index (NSI) _____ 48.3% by wt.
Total bacterial count/gm. _____ 8,255
Thermophiles/10 gms. _____ 90
Flat sours/10 gms. _____ 55

The concentrate was placed in the vertical, pilot plant, fluid bed drier after the drier had been preheated and the air therein was about 290–300° F. The material outlet pipe for the reheated concentrate was kept open, and the concentrate was dried for 3 minutes. The concentrate reached a maximum temperature of about 196° F.

The ground reheated concentrate was then analyzed as shown in Table XII B, below:

TABLE XII B.—ANALYSIS OF REHEATED, DRIED NEUTRALIZED CONCENTRATE OF SAMPLE 1 OF EXAMPLE VIII

Moisture _____ 3.0% by wt.
Nitrogen Solubility Index (NSI) _____ 28.9% by wt.
Total bacterial count/gm. _____ 530
Thermophiles/10 gms. _____ 5
Flat sours/10 gms. _____ 0

EXAMPLE XIII

The ground, dried, neutralized, soy protein concentrate of sample 2 of Example VIII was analyzed as shown in Table XIII A, below:

TABLE XIII A.—ANALYSIS OF DRIED NEUTRALIZED CONCENTRATE OF SAMPLE 2 OF EXAMPLE VIII

Moisture _____ 10.3% by wt.
Nitrogen Solubility Index (NSI) _____ 47.8% by wt.
Total bacterial count/gm. _____ 23,000
Thermophiles/10 gms. _____ 5,750
Flat sours/10 gms. _____ 3,920

Two 1 lb. aliquots of the dried neutralized concentrate of sample 2 of Example VIII, hereinafter referred to as samples 2a and 2b of Example VIII, were reheated.

The samples 2a and 2b concentrates were placed in the vertical, pilot plant, fluid bed drier after the drier had been preheated so the air therein was about 330° F. and about 365° F. respectively. The material outlet pipe for the dried concentrate was kept open, and the concentrate was dried for about 2 minutes in each instance. The temperatures of samples 2a and 2b were 210° F. and 248° F., respectively.

The ground reheated samples 2a and 2b concentrates were then analyzed as shown in Table VIII B, below:

TABLE XIII B.—ANALYSIS OF REHEATED, DRIED NEUTRALIZED CONCENTRATE OF SAMPLES 2a AND 2b FROM EXAMPLE VIII

|  | Sample 2a (reheated to 210° F.) | Sample 2b (reheated to 248° F.) |
| --- | --- | --- |
| Moisture, percent by weight | 1.1 | 3 |
| Nitrogen Solubility Index (NSI), percent by weight | 16.5 | 13 |
| Total bacterial count/gm | 300 | 140 |
| Thermophiles/10 gms | 5 | 0 |
| Flat sours/10 gms | 0 | 0 |

EXAMPLE XIV

The ground, dried, neutralized, soy protein concentrate of sample 3 of Example VIII was analyzed as shown in Table XIV A, below:

TABLE XIV A.—ANALYSIS OF DRIED NEUTRALIZED CONCENTRATE OF SAMPLE 3 OF EXAMPLE VIII

Moisture _____ 10.9% by wt.
Nitrogen Solubility Index (NSI) _____ 47.1% by wt.
Total bacterial count/gm. _____ 7,200
Thermophiles/10 gms. _____ 120
Flat sours/10 gms. _____ 60

Two, 1 lb. aliquots of the dried neutralized concentrate of sample 3 of Example VIII, hereinafter referred to as samples 3a and 3b of Example VIII, were reheated.

The samples 3a and 3b concentrates were placed in the vertical, pilot plant, fluid bed dried after the drier had been preheated so the air therein reached a temperature of about 260° F. and about 290° F., respectively. The material outlet pipe for the dried concentrate was kept open, and the concentrate was dried for about 2 minutes in each instance. The temperature of samples 3a and 3b were 180° F. and 200° F., respectively.

The ground reheated samples 3a and 3b concentrates were then analyzed as shown in Table XIV B, below:

TABLE XIV B.—ANALYSIS OF REHEATED, DRIED NEUTRALIZED CONCENTRATE OF SAMPLES 3a AND 3b FROM EXAMPLE VIII

|  | Sample 3a (reheated to 180° F.) | Sample 3b (reheated to 200° F.) |
| --- | --- | --- |
| Moisture, percent | 6.1 | 8.5 |
| Nitrogen Solubility Index (NSI) percent | 44.5 | 30.5 |
| Total bacterial count/gm | 580 | 280 |
| Thermophiles/10 gms | 55 | 65 |
| Flat sours/10 gms | 30 | 25 |

Table E, below, summarizes the drying conditions used and nitrogen solubility index (NSI) values obtained, which are set forth in tables of preceding Examples I–V, VII and VIII, and lists these examples in order based upon increasing nitrogen solubility index (NSI) values.

These examples concern the production of natural structured, soluble, soy protein concentrates. by heating the essentially dried, neutralized, soy protein concentrate, for example, to about 170–190° F.

TABLE E.—SUMMARY OF DRYING CONDITIONS AND NITROGEN SOLUBILITY INDEX (NSI) VALUES

| Example | Grits | First stage drying | | Maximum temperature of partly dried product, °F. | Second stage drying | | Maximum temperature of dried product of first run, °F. | Maximum temperature of dried product of continued or repeated first run, °F. | Product from second stage drying | |
|---|---|---|---|---|---|---|---|---|---|---|
| | | Vertical fluid bed drier | Ring drier | | Vertical fluid bed drier | Air drying | | | Percent by weight protein on completely dry basis | NSI, percent |
| I | Cargill | X | | 93 | X | | 156 | 126 | 69.3 | 43.5 |
| VIII (Sample 3) | Staley | X | | 113 | X | | 147 | | 73.6 | 47.1 |
| VII | Staley | X | | 128 | X | | 140 | | 74.6 | 52.8 |
| III | Cargill | X | | 94 | X | | 110 | | 70.7 | 59.8 |
| IV | Staley | X | | 98 | X | | 116 | 129 | 74 | 62.8 |
| V (Sample 2) | Cargill (500 lbs.) | | X | 80 | | X | Air-dried | | 66.3 | 62.8 |
| VIII (Sample 3) | do | | X | 80 | | X | Air-dried | | 67.8 | 64.1 |
| II | Cargill | X | | 103 | X | | 122 | | 71.3 | 64.4 |
| VIII (Sample 4) | Cargill (500 lbs.) | | X | 80 | X | | 120 | 123 | 67.3 | 68.5 |

Table E, above, shows that Examples I, II, III, IV, V (samples 2–4), VII and VIII (sample 3) produced dried, neutralized, soy protein concentrates which did not undergo substantial denaturation (e.g., as evidenced by NSI values of at least 40% by weight), and said examples utilized first and second stage drying operations wherein the above recorded temperatures of the product did not exceed recorded temperatures of about 128° F. and about 156° F., respectively, under the processing conditions thereof.

In those examples, we preferred not to use first and second stage drying operations wherein the temperature of the product exceeded about 140° F. and about 160° F., respectively, and, more desirably, the temperature of the product should not exceed about 130° F. and 145° F., respectively, particularly when substantial denaturation is to be avoided.

Table F, below, summarizes the terminal bacterial control conditions used and results obtained in preceding Examples X–XIV.

TABLE F.—SUMMARY OF HEATING CONDITIONS USED FOR TERMINAL BACTERIAL CONTROL

| Example | Air temperature in preheated vertical fluid bed drier, °F. | Maximum temperature of heated concentrate, °F. | NSI before heating, percent | NSI after heating, percent | Percent of initial bacterial count remaining after terminal heating | | |
|---|---|---|---|---|---|---|---|
| | | | | | Total bacteria | Thermophiles | Flat sour |
| X * | 235 | ca. 235 | 68.5 | 29.9 | 4.8 | 8.5 | 9.1 |
| XI | 220–230 | 166 | 52.8 | 53.6 | 27.4 | 64.4 | 77 |
| XII | 290–300 | 196 | 48.3 | 28.9 | 6.4 | 5.5 | 0 |
| XIII: | | | | | | | |
| Sample 2a | 330 | 210 | 47.8 | 16.5 | 1.3 | 0.09 | 0 |
| Sample 2b | 365 | 248 | 47.8 | 13 | 0.6 | 0 | 0 |
| XIV: | | | | | | | |
| Sample 3a | 260 | 180 | 47.1 | 44.5 | 8.05 | 45.8 | 50 |
| Sample 3b | 290 | 200 | 47.1 | 30.5 | 3.9 | 54.2 | 41.6 |

* The dried, neutralized, soy protein concentrate had an unusually high and not typical initial total bacterial count (10,000,000/gm.) because the concentrate was subjected to repeated handling and lengthy storage prior to terminal bacterial control.

Table F, above, show that: Examples X, XII and XIII (samples 2a and 2b) produced outstanding overall bacterial control by heating the essentially dried, neutralized, soy protein concentrate to maximum temperatures of about 196–248° F., but the final concentrates had nitrogen solubility indices (NSI) of 13% to 29.9%; Examples XI and XIV (sample 3a) produced concentrates which had nitrogen solubility indices (NSI) of 53.6% and 44.5%, respectively, and involved heating the concentrate to a maximum temperature of about 166° F. and about 180° F., respectively; Example XIX (sample 3a), which involved heating the concentrate to a maximum temperature of about 180° F., produced a concentrate which had a nitrogen solubility index (NSI) of 44.5% and underwent substantial, total terminal bacterial control.

It is evident that one can obtain good terminal bacterial control and obtain a concentrate, for example, having a nitrogen solubility index (NSI) of more than about 40%,

EXAMPLE XV

Twenty pounds of shelled, skinned peanuts were reduced in size by being comminuted in a Silent Cutter so the coarsely ground peanuts were within the particle size range of 5–10-mesh. The coarsely ground peanuts were given successive washes with hot and cold hexane to reduce their fat content from 45% to 5% by weight. It was found that 81% by weight of the defatted peanuts was retained on a 20-mesh screen and 3% by weight remained on a 5-mesh screen. The defatted, solvent extracted, coarsely ground peanuts or peanut meal had natural structure and texture and a pH of 6.9 and was analyzed as follows:

| | Percent by weight |
|---|---|
| Moisture | 5.2 |
| Protein content based on moist meal | 59.2 |
| Protein content based on dry meal | 62.4 |
| Nitrogen Solubility Index (NSI) | 85.3 |

An aqueous, isoelectric, peanut protein slurry was prepared with the following materials:

| | | |
|---|---|---|
| Defatted, coarsely ground peanut meal | lbs | 4 |
| Water | gals | 2.7 |
| Sodium bisulfite | lb | 0.02 |
| 22° Bé. hydrochloric acid | lb | 0.21 |

The above slurry was agitated for 10 minutes and was found to have a pH of 4.1. The slurry was centrifuged in a Tolhurst basket centrifuge having a 12-in. diameter basket. The insoluble, peanut protein cake was reslurried with 1.9 gals. of water (considered a washing step), and was again centrifuged in the Tolhurst basket centrifuge. The wet, insoluble, washed, peanut protein meal weighed 8 lbs., contained 35% by weight solids and constituted a yield of 70% by weight based on the weight of the defatted, coarsely ground peanut metal initilly used.

The wet, peanut protein concentrate was partly dried in a vertical, pilot plant, fluid bed drier. The operating conditions in this first drying step were as shown in Table XV A, below:

TABLE XV A.—FIRST STAGE DRYING WITH VERTICAL, PILOT PLANT, FLUID BED DRIER

| Length of time fluid bed drier was operated | Air inlet temperature, °F. | Air in lower chamber, °F. | Air outlet temperature, °F. | Temperature of partly dried product, °F. |
|---|---|---|---|---|
| 0 (start of run) | 238 | 238 | 225 | |
| 5 min | 234 | 170 | 171 | 103 |
| 8 min | 219 | 164 | 148 | 103 |
| 13 min. (air heater cut off) | | 114 | 116 | 111 |

The recovered, partly dried, peanut protein meal, which had 30.1% by weight moisture, was placed in a mixing pan with 70 gm. of 25% by weight sodium hydroxide solution. The sodium hydroxide solution was readily mixed with the concentrate without forming a viscous or gummy mass. The neutralized peanut protein meal had a pH of 8.4 (some excess sodium hydroxide was present).

The neutralized, peanut protein meal was dried in the vertical, pilot plant, fluid bed drier under the conditions shown in Table XV B, below:

TABLE XV B.—SECOND STAGE DRYING WITH VERTICAL, PILOT PLANT, FLUID BED DRIER

| Length of time fluid bed drier was operated | Air inlet temperature, °F. | Air in lower chamber, °F. | Air outlet temperature, °F. | Temperature of dried product, °F. |
|---|---|---|---|---|
| 0 (start of run) | 235 | 231 | 217 | |
| 3 min | 238 | 222 | 198 | 150 |
| 4 min. (air heater cut off) | | 160 | 160 | 150 |

The neutralized peanut concentrate from the second drying step was blended and was found to have 7.3% by weight moisture and natural structure and texture, and 47% by weight of the concentrate was retained on a 10-mesh screen and 53% by weight of the concentrate was retained on a 20-mesh screen. The isoelectric extraction and washing procedure substantially removed the peanut flavor, and the final, peanut protein concentrate was bland. The analysis of the dried, neutralized, natural structured, peanut protein concentrate was as shown in Table XV C, below:

Table XV C.—Dried, neutralized, peanut protein concentrate [1]

| | Percent by weight |
|---|---|
| Moisture | 7.3 |
| Protein content based on dried neutralized concentrate | 65.7 |
| Protein content based on 100% dried neutralized concentrate | 70.9 |
| Nitrogen Solubility Index (NSI) | 63.8 |

[1] pH was 6.5.

The neutralized concentrate from the second drying step and defatted, coarsely ground peanut meal used in its manufacture were tested for cold water-absorption and hot water-absorption as stated in Tests 2 and 3, above. The results of these tests are shown in Table XV D, below:

TABLE XV D.—WATER-ABSORPTION

| | Percent | |
|---|---|---|
| | Cold water-absorption | Hot water-absorption |
| Defatted, coarsely ground peanut meal | 81 | 175 |
| Dried, neutralized, peanut protein concentrate of this example | 126 | 198 |

The neutralized concentrate from the second drying step was ground in a laboratory Fitz Mill so as to pass through a 100-mesh screen and its viscosity was determined as shown in Test 4, above, at 10% and 15% by weight solids. The results of these tests are shown in Table XV E, below:

TABLE XXII E.—VISCOSITY

| | Viscosity in centipoises for— | |
|---|---|---|
| | 10% by weight solids | 15% by weight solids |
| Dried, neutralized, peanut protein concentrate of this example | 9 | 31 |

In commercial operations for preparing natural structured and textured, soluble, peanut protein concentrate, the shell and skin of the peanuts would be removed. The resulting peanut meal could be treated with steam, flaked (e.g., with flaking rolls) and extracted with solvent. The defatted peanut meal would be subjected to isoelectric extraction, washing and centrifugation. The insoluble peanut material would then be, preferably, at least partly dried, neutralized and again dried to the desired moisture content. Both drying steps may be conducted in a flash drier. If desired or necessary, the dried concentrate could be partly subdivided.

Table G, below, summarizes the drying conditions used and nitrogen solubility index (NSI) obtained in Example XV, above, and which are set forth in Tables XVA through XV C thereof. Example XV concerns the production of a natural structured, soluble, peanut protein concentrate.

TABLE G.—SUMMARY OF DRYING CONDITIONS AND NITROGEN SOLUBILITY INDEX (MSI) VALUES

| | | First stage drying | | Second stage drying | | Product from second stage drying | |
|---|---|---|---|---|---|---|---|
| Example | Meal | Vertical fluid bed drier | Maximum temperature of partly dried product, °F. | Vertical fluid bed drier | Maximum temperature of dried product, °F. | Percent by weight protein on completely dry basis | NSI, percent |
| XV | Peanut meal prepared in the laboratory | X | 111 | X | 150 | 70.9 | 63.8 |

The forms of the invention herein shown and described are to be considered only as illustrative. It will be apparent to those skilled in the art that numerous modifications may be made therein without departure from the spirit of the invention or the scope of the appended claims.

We claim:

1. A method of producing edible, uniformly palatable, vegetable protein concentrate having natural structure and texture and suitable for use in food products, which comprises extracting vegetable protein material from the group consisting of defatted soy protein and defatted peanut protein, a substantial portion of which does not pass through a 40-mesh screen, having natural structure and texture and a nitrogen solubility index above 15% by weight with water in the vicinity of the isoelectric pH of the protein content thereof and substantially removing the soluble, undesired, characteristic taste-conferring material and recovering the insoluble, wet protein material, drying said wet, insoluble protein material to reduce the moisture content thereof under controlled conditions to a moisture content within the range of about 20–45% without lowering its nitrogen solubility index to below 15% by weight, raising the pH of said insoluble protein material after it has been subjected to said drying within the pH range of about 5.5–10.5 and drying the protein material having the raised pH under controlled conditions to produce said vegetable protein concentrate having natural structure and texture, and which is characterized by
  (a) having been substantially freed of undesired, characteristic taste-conferring material which characterizes the vegetable protein material from which the concentrate is prepared,
  (b) good protein solubility and minimized denaturation characteristics as evidenced by a nitrogen solubility index of at least 15% by weight,
  (c) good water-absorption and water-retention properties,
  (d) good water-binding properties, and
  (e) at least about 60% by weight protein on a dry basis.

2. The method of claim 1 wherein the vegetable protein concentrate has a nitrogen solubility index of at least about 40% by weight.

3. The method of claim 1 wherein the vegetable protein material having natural structure and texture which is subjected to extraction is from the group consisting of defatted soy protein and defatted peanut protein, and has a nitrogen solubility index above 40% by weight.

4. The method of claim 1 wherein the vegetable protein concentrate is subjected to terminal bacterial control after said raising of the pH of said vegetable protein material from the group consisting of defatted soy protein and defatted peanut protein.

5. The method of claim 1 wherein the vegetable protein material has at least about 70% by weight protein on a dry basis.

6. The method of claim 1 wherein the vegetable protein material is defatted soy protein.

7. The method of claim 1 wherein the vegetable protein material is defatted peanut protein.

8. The method of claim 1 wherein the vegetable protein material is defatted soy protein, and the defatted soy protein concentrate has at least about 70% by weight protein on a dry basis.

9. The method of claim 1 wherein the vegetable protein material is defatted soy protein, and the defatted soy protein concentrate is subjected to terminal bacterial control after said raising of the pH of the defatted soy protein material.

10. The method of claim 1 wherein the vegetable protein material having natural structure and texture which is subjected to extraction is defatted soy protein having a nitrogen solubility index above 40% by weight.

11. A method of producing edible, uniformly palatable, vegetable protein concentrate suitable for use in food products, which comprises extracting vegetable protein material from the group consisting of defatted soy protein and defatted peanut protein, a substantial portion of which does not pass through a 40-mesh screen, having natural structure and texture and a nitrogen solubility index above 15% by weight with water in the vicinity of the isoelectric pH of the protein content thereof and substantially removing the soluble, undesired, characteristic taste-conferring material and recovering the insoluble, wet protein material, drying said wet, insoluble protein material under controlled conditions to a moisture content within the range of about 5 to 55% by weight water without lowering its nitrogen solubility index to below 15% by weight, raising the pH of said insoluble protein material after it has been subjected to said drying within the pH range of about 5.5–10.5, and drying the protein material having the raised pH under controlled conditions to produce said vegetable protein concentrate having natural structure and texture, and which is characterized by
  (a) having been substantially freed of undesired, characteristic taste-conferring material which characterizes the vegetable protein material from which the concentrate is prepared,
  (b) good protein solubility and minimized denaturation characteristics as evidenced by a nitrogen solubility index of at least 15% by weight,
  (c) good water-absorption and water-retention properties,
  (d) good water-binding properties, and
  (e) at least about 60% by weight protein on a dry basis.

12. The method of claim 11 wherein the vegetable protein concentrate has a nitrogen solubility index of at least about 40% by weight.

13. The method of claim 11 wherein the vegetable protein material having natural structure and texture which is subjected to extraction is from the group consisting of defatted soy protein and defatted peanut protein, and has a nitrogen solubility index above 40% by weight.

14. The method of claim 11 wherein the vegetable protein concentrate is subjected to terminal bacterial control after said raising of the pH of said vegetable protein material from the group consisting of defatted soy protein and defatted peanut protein.

15. The method of claim 11 wherein the vegetable protein material has at least about 70% by weight protein on a dry basis.

16. The method of claim 11 wherein the vegetable protein material is defatted soy protein.

17. The method of claim 11 wherein the vegetable protein material is defatted peanut protein.

18. The method of claim 11 wherein the vegetable protein material is defatted soy protein, and the defatted soy protein concentrate has at least about 70% by weight protein on a dry basis.

19. The method of claim 11 wherein the vegetable protein material is defatted soy protein, and the defatted soy protein concentrate is subjected to terminal bacterial control after said raising of the pH of the defatted soy protein material.

20. The method of claim 11 wherein the vegetable protein material having natural structure and texture which is subjected to extraction is defatted soy protein having a nitrogen solubility index above 40% by weight.

21. A method of producing edible, uniformly palatable, vegetable protein concentrate suitable for use in food products, which comprises extracting vegetable protein material from the group consisting of defatted soy protein and defatted peanut protein, a substantial portion of which does not pass through a 40-mesh screen, having natural structure and texture and a nitrogen solubility index above 15% by weight with water in the vicinity of the isoelectric pH of the protein content thereof and substantially removing the soluble, undesired, characteristic taste-conferring material and recovering the insoluble, wet protein material, drying said wet, insoluble protein material to reduce the moisture content thereof under controlled conditions to a moisture content within the range of about 20–45% without lowering its nitrogen solubility index to below 15% by weight, raising the pH of said insoluble protein material after it has been subjected to said drying within the pH range of about 5.5–10.5, drying under controlled conditions, and comminuting the protein material, in a selected sequence, to produce a vegetable protein concentrate which is characterized by
  (a) having been substantially freed of undesired, characteristic taste-conferring material which characterizes the vegetable protein material from which the concentrate is prepared,
  (b) good protein solubility and minimized denaturation characteristics as evidenced by a nitrogen solubility index of at least 15% by weight,
  (c) good water-absorption and water-retention properties, (d) good emulsifying and water-binding properties, and (e) at least about 60% by weight protein on a dry basis.

22. The method of claim 21 wherein the vegetable protein concentrate has a nitrogen solubility index of at least about 40% by weight.

23. The method of claim 21 wherein the vegetable protein material having natural structure and texture which is subjected to extraction is from the group consisting of defatted soy protein and defatted peanut protein, and has a nitrogen solubility index above 40% by weight.

24. The method of claim 21 wherein the vegetable protein concentrate is subjected to terminal bacterial control after said raising of the pH of said vegetable protein material from the group consisting of defatted soy protein and defatted peanut protein.

25. The method of claim 21 wherein the vegetable protein material has at least about 70% by weight protein on a dry basis.

26. The method of claim 21 wherein the vegetable protein material is defatted soy protein.

27. The method of claim 21 wherein the vegetable protein material is defatted peanut protein.

28. The method of claim 21 wherein the vegetable protein material is defatted soy protein, and the defatted soy protein concentrate has at least about 70% by weight protein on a dry basis.

29. The method of claim 21 wherein the vegetable protein material is defatted soy protein, and the defatted soy protein concentrate is subjected to terminal bacterial control after said raising of the pH of the defatted soy protein material.

30. The method of claim 21 wherein the vegetable protein material having natural structure and texture which is subjected to extraction is defatted soy protein having a nitrogen solubility about 40% by weight.

31. A method of producing edible, uniformly palatable, vegetable protein concentrate suitable for use in food products, which comprises extracting vegetable protein material from the group consisting of defatted soy protein and defatted peanut protein, a substantial portion of which does not pass through a 40-mesh screen, having natural structure and texture and a nitrogen solubility index above 15% by weight with water in the vicinity of the isoelectric pH of the protein content thereof and substantially removing the soluble, undesired, characteristic taste-conferring material and recovering the insoluble, wet protein material drying said wet, insoluble protein material under controlled conditions to a moisture content within the range of about 5 to 55% by weight water without lowering its nitrogen solubility index to below 15% by weight, raising the pH of said insoluble protein material after it has been subjected to said drying within the pH range of about 5.5–10.5, drying under controlled conditions, and comminuting the protein material, in a selected sequence, to produce a vegetable protein concentrate which is characterized by (a) having been substantially freed of undesired, characteristic taste-conferring material which characterizes the vegetable protein material from which the concentrate is prepared, (b) good protein solubility and minimized denaturation characteristics as evidenced by a nitrogen solubility index of at least 15% by weight, (c) good water-absorption and water-retention properties, (d) good emulsifying and water-binding properties, and (e) at least about 60% by weight protein on a dry basis.

32. The method of claim 31 wherein the vegetable protein concentrate has a nitrogen solubility index of at least about 40% by weight.

33. The method of claim 31 wherein the vegetable protein material having natural structure and texture which is subjected to extraction is from the group consisting of defatted soy protein and defatted peanut protein, and has a nitrogen solubility index above 40% by weight.

34. The method of claim 31 wherein the vegetable protein concentrate is subjected to terminal bacterial control after said raising of the pH of said vegetable protein material from the group consisting of defatted soy protein and defatted peanut protein.

35. The method of claim 31 wherein the vegetable protein material has at least about 70% by weight protein on a dry basis.

36. The method of claim 31 wherein the vegetable protein material is defatted soy protein.

37. The method of claim 31 wherein the vegetable protein material is defatted peanut protein.

38. The method of claim 31 wherein the vegetable protein material is defatted soy protein, and the defatted soy protein concentrate has at least about 70% by weight protein on a dry basis.

39. The method of claim 31 wherein the vegetable protein material is defatted soy protein, and the defatted soy protein concentrate is subjected to terminal bacterial control after said raising of the pH of the defatted soy protein material.

40. The method of claim 31 wherein the vegetable protein material having natural structure and texture which is subjected to extraction is defatted soy protein having a nitrogen solubility index above 40% by weight.

References Cited

UNITED STATES PATENTS

| | | | |
|---|---|---|---|
| 2,881,076 | 4/1959 | Sair | 99—14 |
| 3,635,726 | 1/1972 | Sair | 99—17 |
| 3,607,860 | 9/1971 | Yamota et al. | 99—17 |
| 2,751,301 | 6/1956 | Leslie et al. | 99—2 |

OTHER REFERENCES

Ziemba, John V.: "Let Soy Proteins Work Wonders For You," Food Engineering, May 1966, pp. 82–84, 87–90, 93.

A. LOUIS MONACELL, Primary Examiner

W. A. SIMONS, Assistant Examiner

U.S. Cl. X.R.

260—123.5; 426—459

UNITED STATES PATENT OFFICE
CERTIFICATE OF CORRECTION

Patent No. 3,809,767                                  Dated May 7, 1974

Inventor(s) Louis Sair and Irving Melcer

It is certified that error appears in the above-identified patent and that said Letters Patent are hereby corrected as shown below:

Column 1, line 29, insert "a" after --to-- (first occurence); column 2, line 32, change "ben" to --been--; column 3, line 70, insert a comma [,] after "solubility"; column 5, line 62, change "VID" to --XVD--; column 11, line 16, change "1" (both occurences, before "NaOH" and "HCl") to --IN--; column 14, line 67, change "dried" to --drier--; column 16, line 34, in the title of Table 1B, insert a comma [,] after "VERTICAL"; line 49, change "dried" to --drier--; column 24, Table VD below line 2, in last vertical column of tabulated numerical values at right margin, the numerical values should be corrected so as to read --7.9%--, --62.0%--, --67.3%-- and --68.5%--; column 24, Table VIIB, last heading at right margin, omit the word "partly"; column 25, Table VIIIA, last heading at right margin, after "of" insert --partly--; Table VIIIB, last heading at right margin, omit the word "partly"; column 28, line 8, "VIII" should be --XIII--; line 44, "dried" should be --drier--; Table XIVB, line 63, first entry in last column at right margin, "8.5" should be --5.8--; column 29, Table E, _____ line 68, "XIX" should be --XIV--; column 30, line 75, "metal initilly" should be --meal initially--; column 32, line 15, "TABLE XXIIE" should read --TABLE XVE--; first line (title) of Table G, "(MSI)" should be --(NSI)--.

Signed and sealed this 7th day of January 1975.

(SEAL)
Attest:

McCOY M. GIBSON JR.　　　　　　　　　C. MARSHALL DANN
Attesting Officer　　　　　　　　　　　Commissioner of Patents